United States Patent
Koshisaka et al.

(10) Patent No.: US 10,739,812 B2
(45) Date of Patent: Aug. 11, 2020

(54) COMMUNICATION SYSTEM AND COMMUNICATION METHOD

(71) Applicant: Sony Corporation, Tokyo (JP)

(72) Inventors: Naohiro Koshisaka, Kanagawa (JP); Hiroo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 15/772,253

(22) PCT Filed: Nov. 16, 2016

(86) PCT No.: PCT/JP2016/083911
§ 371 (c)(1),
(2) Date: Apr. 30, 2018

(87) PCT Pub. No.: WO2017/098871
PCT Pub. Date: Jun. 15, 2017

(65) Prior Publication Data
US 2018/0321705 A1    Nov. 8, 2018

(30) Foreign Application Priority Data

Dec. 11, 2015 (JP) ................................ 2015-242503

(51) Int. Cl.
*G06F 1/12* (2006.01)
*G06F 13/42* (2006.01)
(Continued)

(52) U.S. Cl.
CPC ................ *G06F 1/12* (2013.01); *G06F 13/42* (2013.01); *H04L 7/0008* (2013.01);
(Continued)

(58) Field of Classification Search
CPC ......... G06F 1/12; G06F 13/42; H04L 7/0008; H04L 7/0012; H04L 7/06; H04L 29/08; H04L 25/00
See application file for complete search history.

(56) References Cited

U.S. PATENT DOCUMENTS 8,279,769 B2 * 10/2012 den Besten ......... G06F 13/4072
370/252
9,606,954 B2 * 3/2017 Marena ............... G06F 13/4286
(Continued)

FOREIGN PATENT DOCUMENTS

JP    2001-308940 A    11/2001
JP    2005-354271 A    12/2005
(Continued)

OTHER PUBLICATIONS

Extended European Search Report dated Sep. 10, 2018 for corresponding European Application No. 16872771.7.

*Primary Examiner* — Stefan Stoynov
(74) *Attorney, Agent, or Firm* — Michael Best & Friedrich LLP

(57) ABSTRACT

A communication system according to an embodiment of the disclosure includes a transmission device and a reception device. The transmission device outputs a clock signal with a clock frequency corresponding to a transmission mode, and outputs a data signal corresponding to the transmission mode. The reception device receives the clock signal and the data signal, and determines the transmission mode on a basis of magnitude of the clock frequency of the received clock signal.

5 Claims, 19 Drawing Sheets

(51) Int. Cl.
   *H04L 7/00*    (2006.01)
   *H04L 7/06*    (2006.01)
   *H04L 25/00*   (2006.01)
   *H04L 29/08*   (2006.01)

(52) U.S. Cl.
   CPC ............ *H04L 7/0012* (2013.01); *H04L 7/06* (2013.01); *H04L 25/00* (2013.01); *H04L 29/08* (2013.01)

(56) References Cited

U.S. PATENT DOCUMENTS

| | | | |
|---|---|---|---|
| 10,074,339 B2 * | 9/2018 | Higashino | G09G 5/006 |
| 2006/0120296 A1 | 6/2006 | Goh | |
| 2008/0297213 A1 * | 12/2008 | Abbasfar | H03L 7/07 327/156 |
| 2009/0110130 A1 | 4/2009 | Boomer et al. | |
| 2011/0043707 A1 * | 2/2011 | Umezu | H04N 21/4122 348/723 |

FOREIGN PATENT DOCUMENTS

| | | |
|---|---|---|
| JP | 2007-049217 A | 2/2007 |
| JP | 2010-062863 A | 3/2010 |
| JP | 2014-522204 A | 8/2014 |
| JP | 2015-122656 A | 7/2015 |
| WO | WO-2009/058790 A1 | 5/2009 |

\* cited by examiner

[FIG. 1]
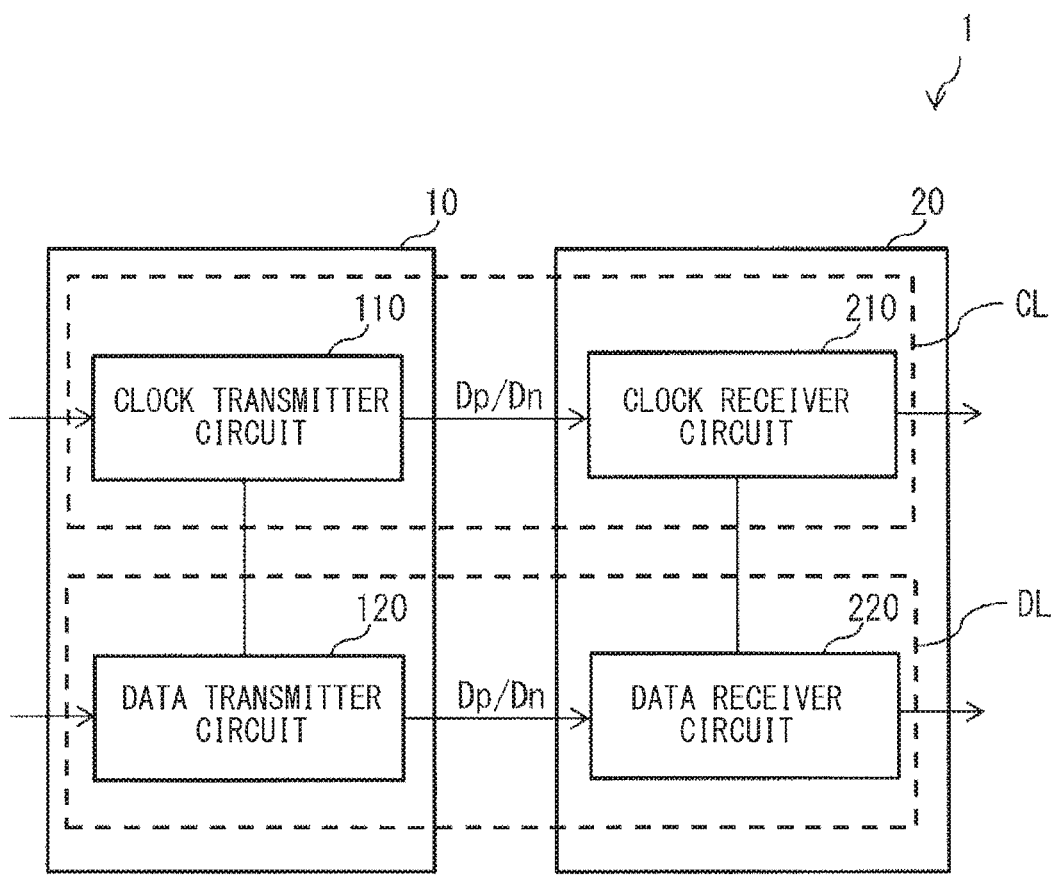

[FIG. 2]
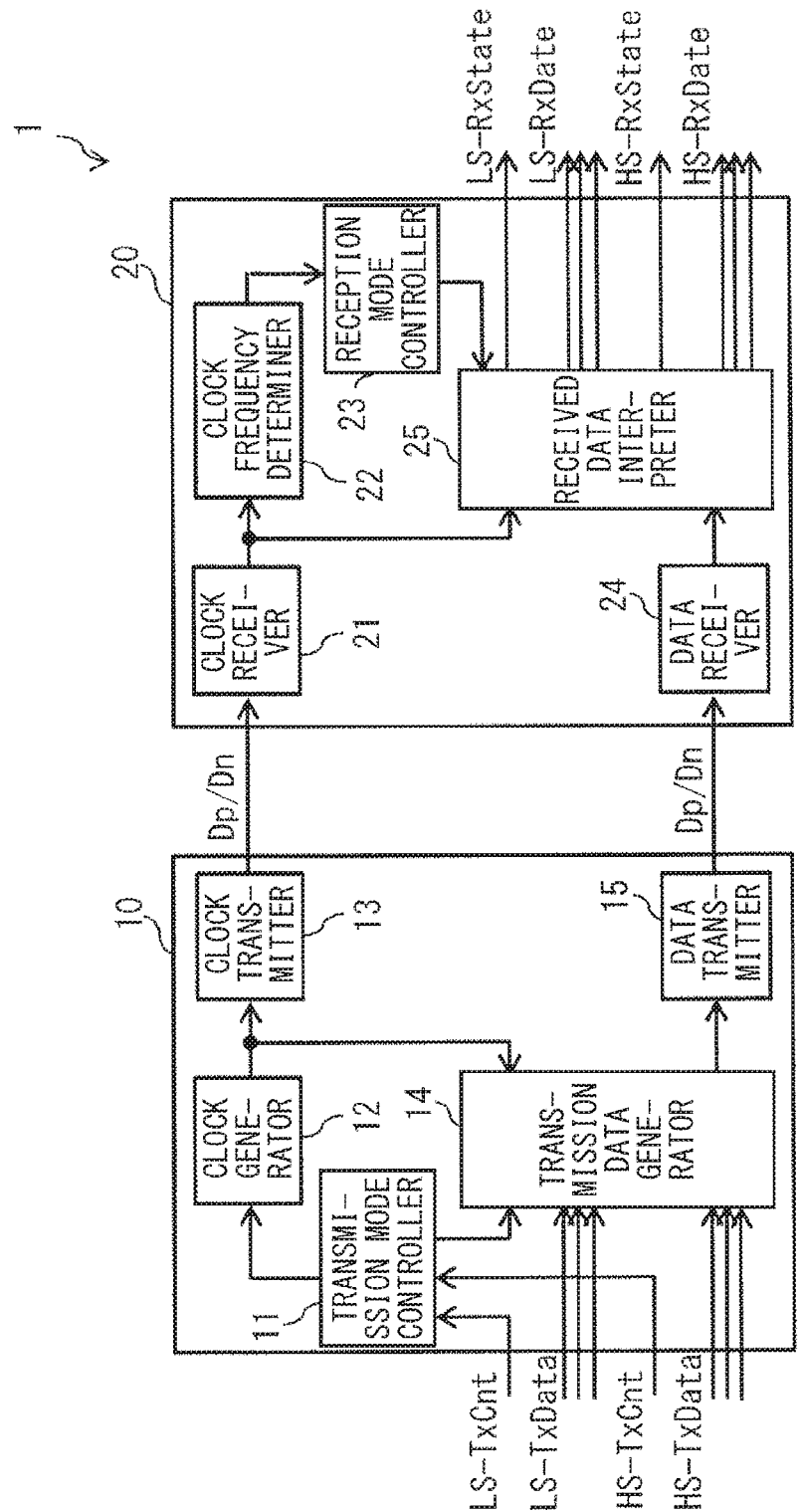

[ FIG. 3 ]
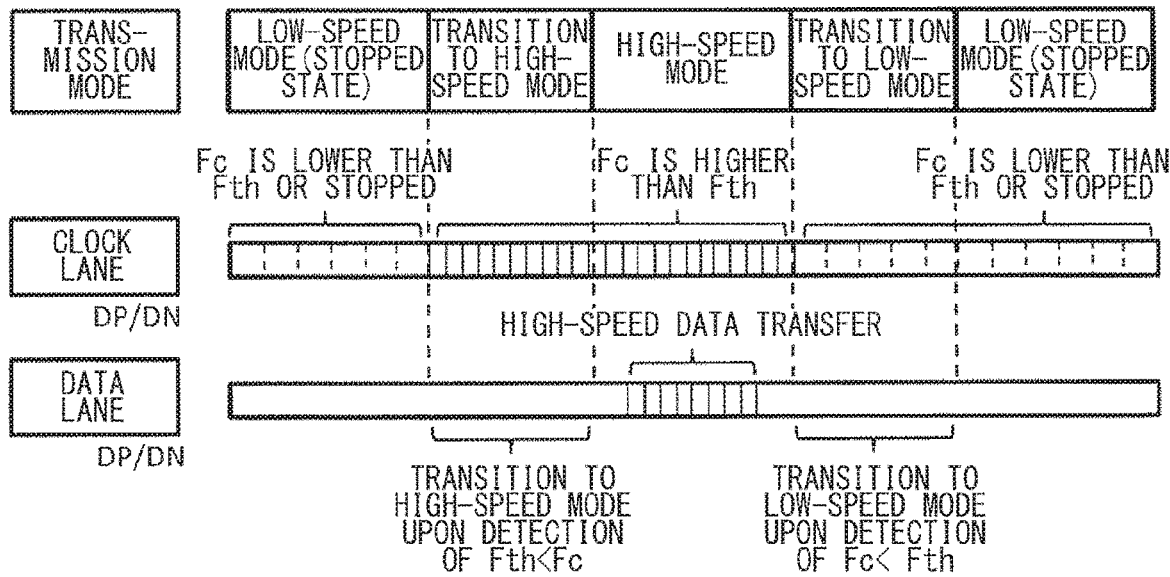
[ FIG. 4 ]
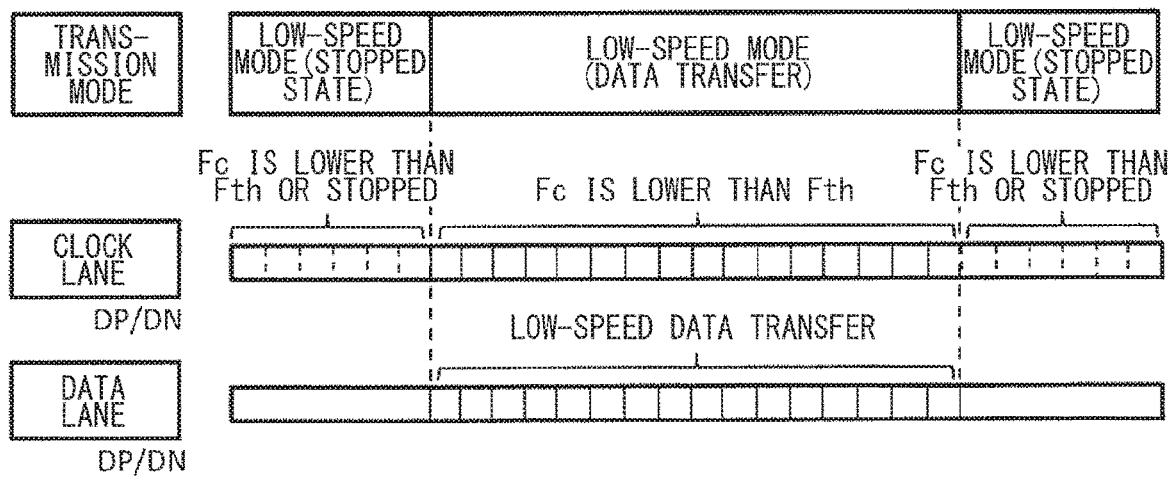

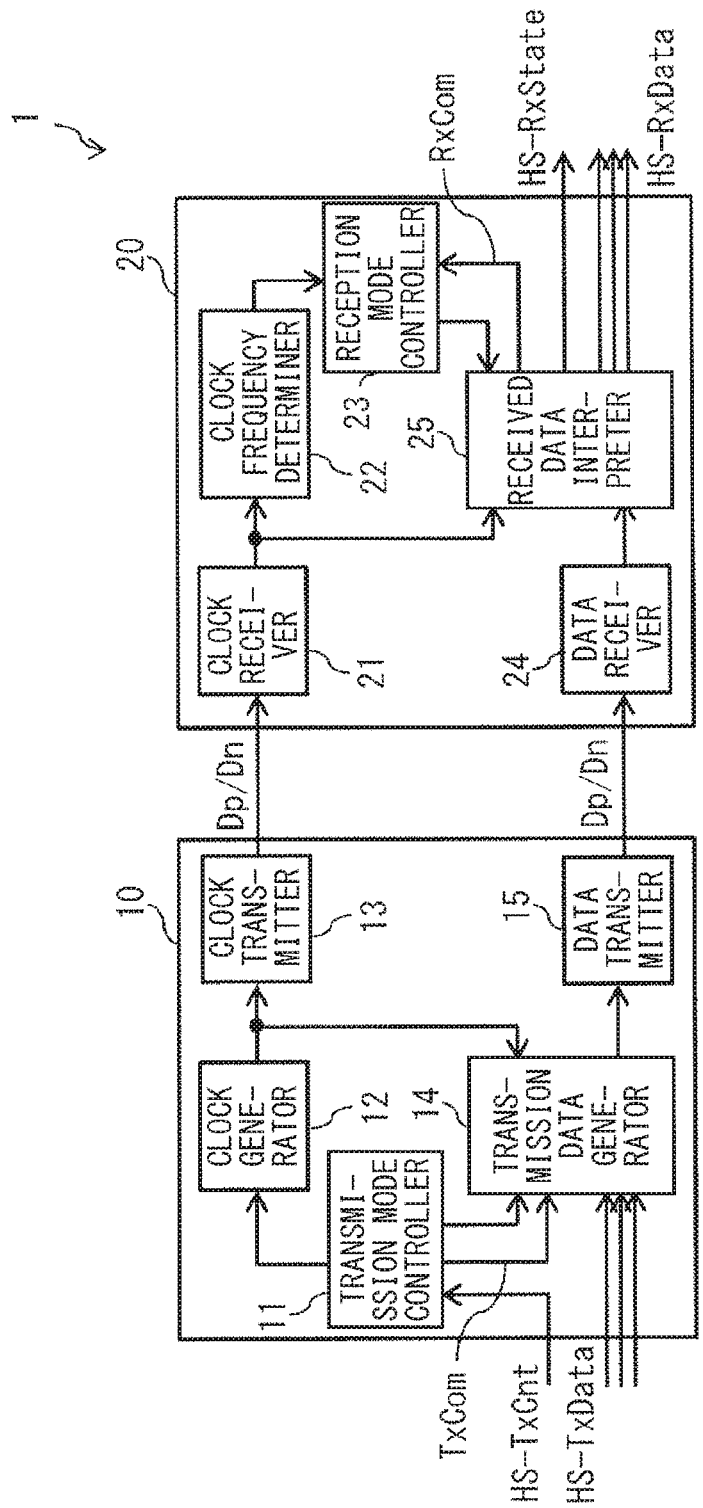
[FIG. 5]

[ FIG. 6 ]
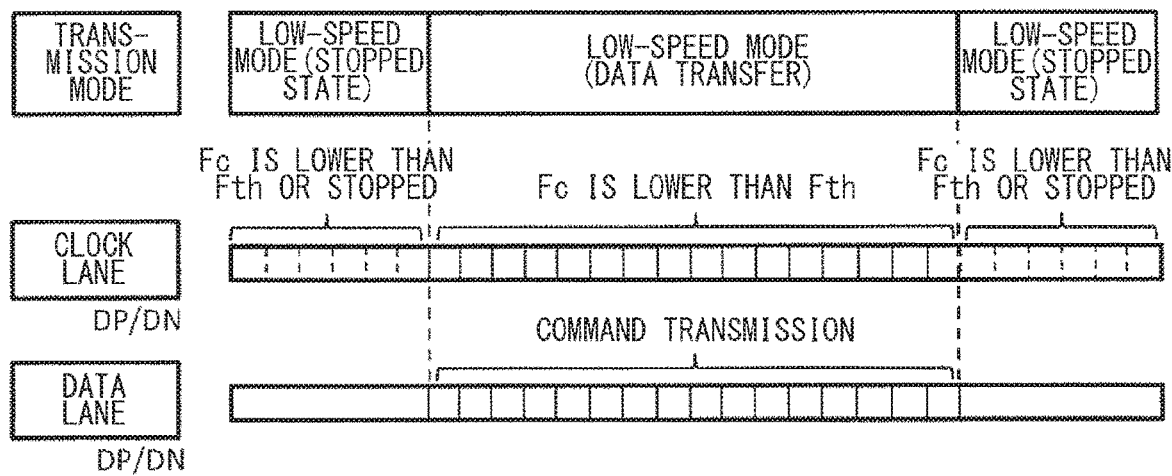

[ FIG. 7 ]
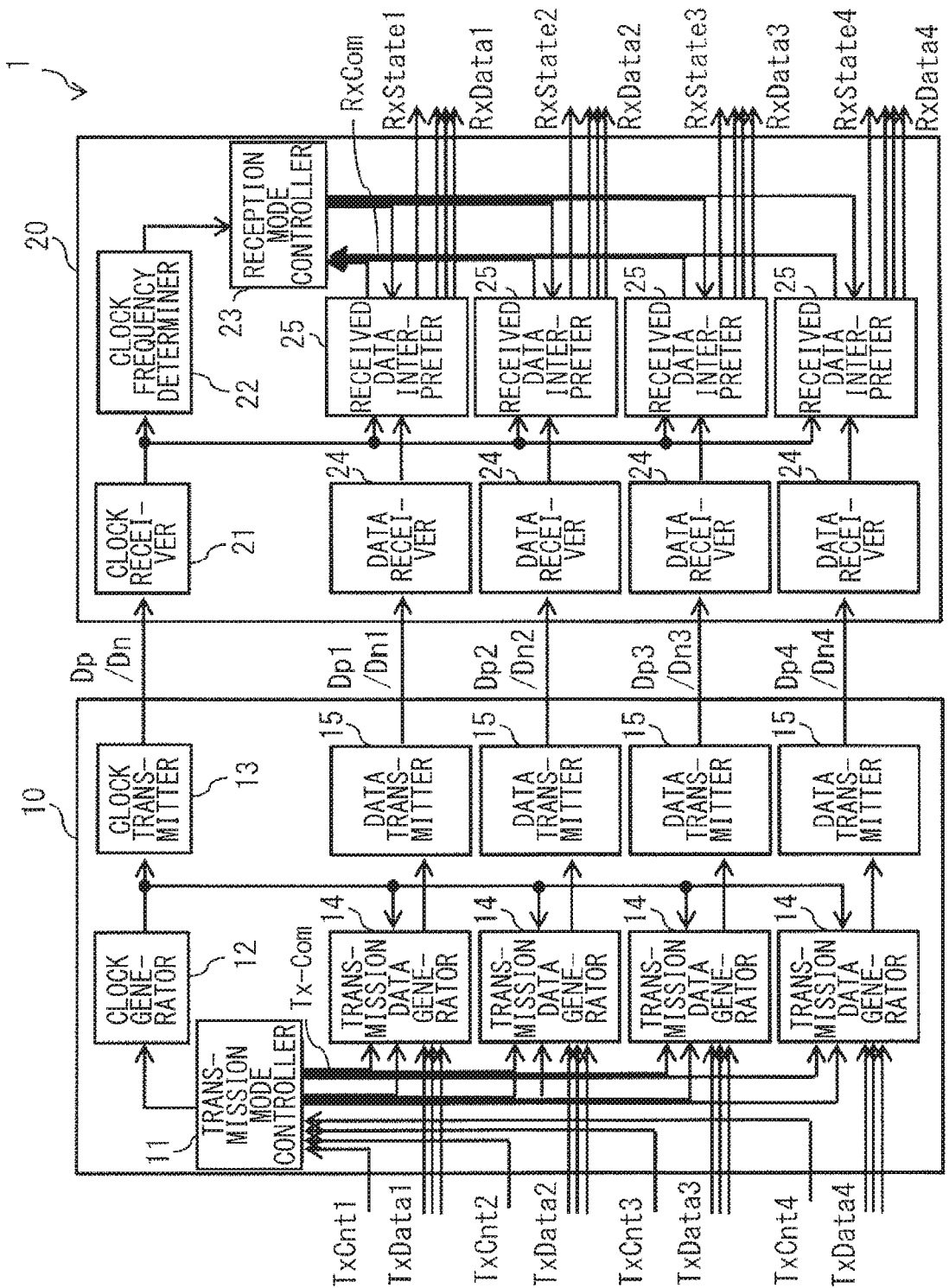

[ FIG. 8 ]
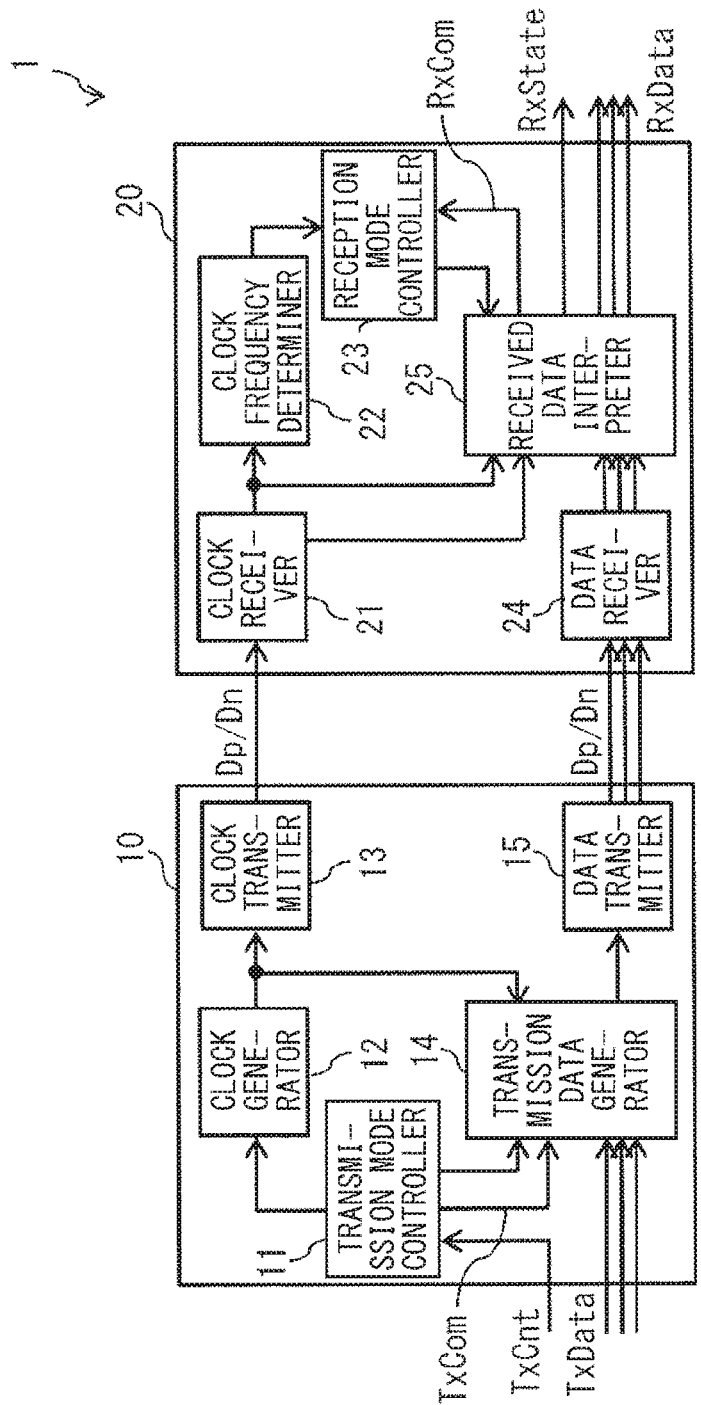

[FIG. 9]
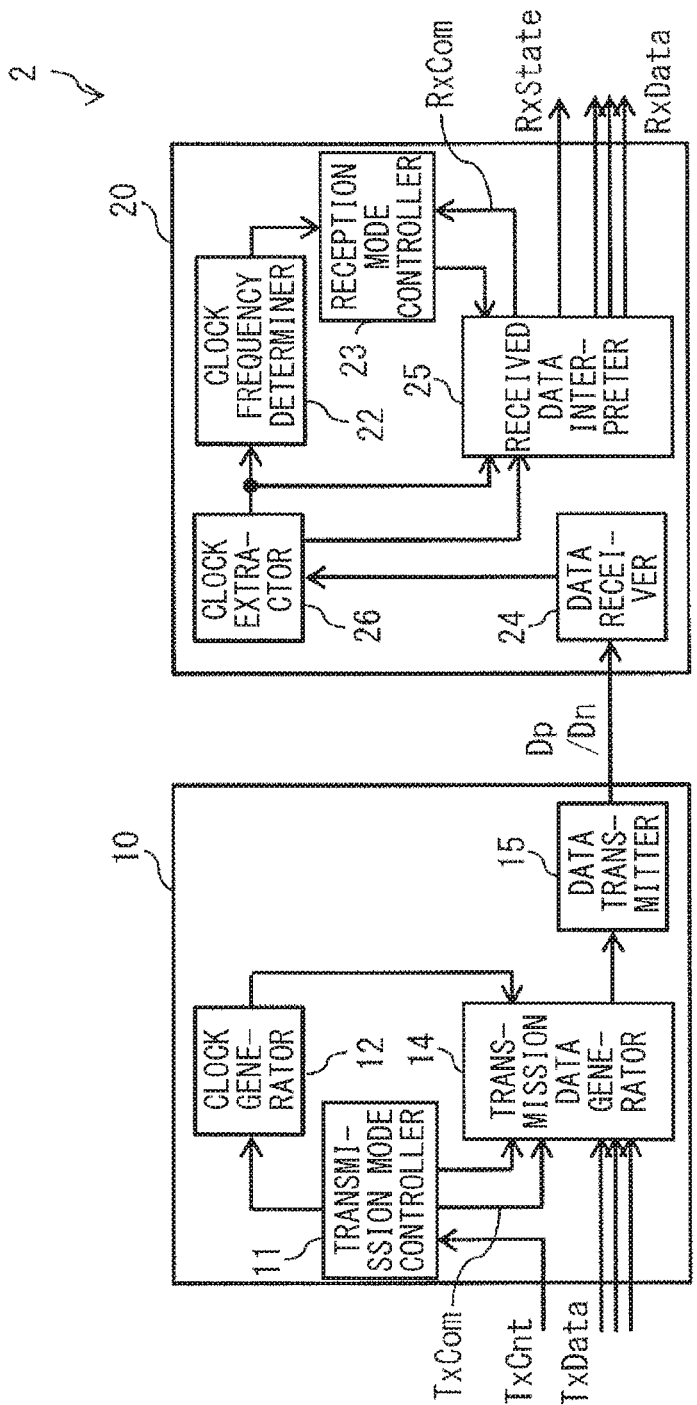

[ FIG. 10 ]
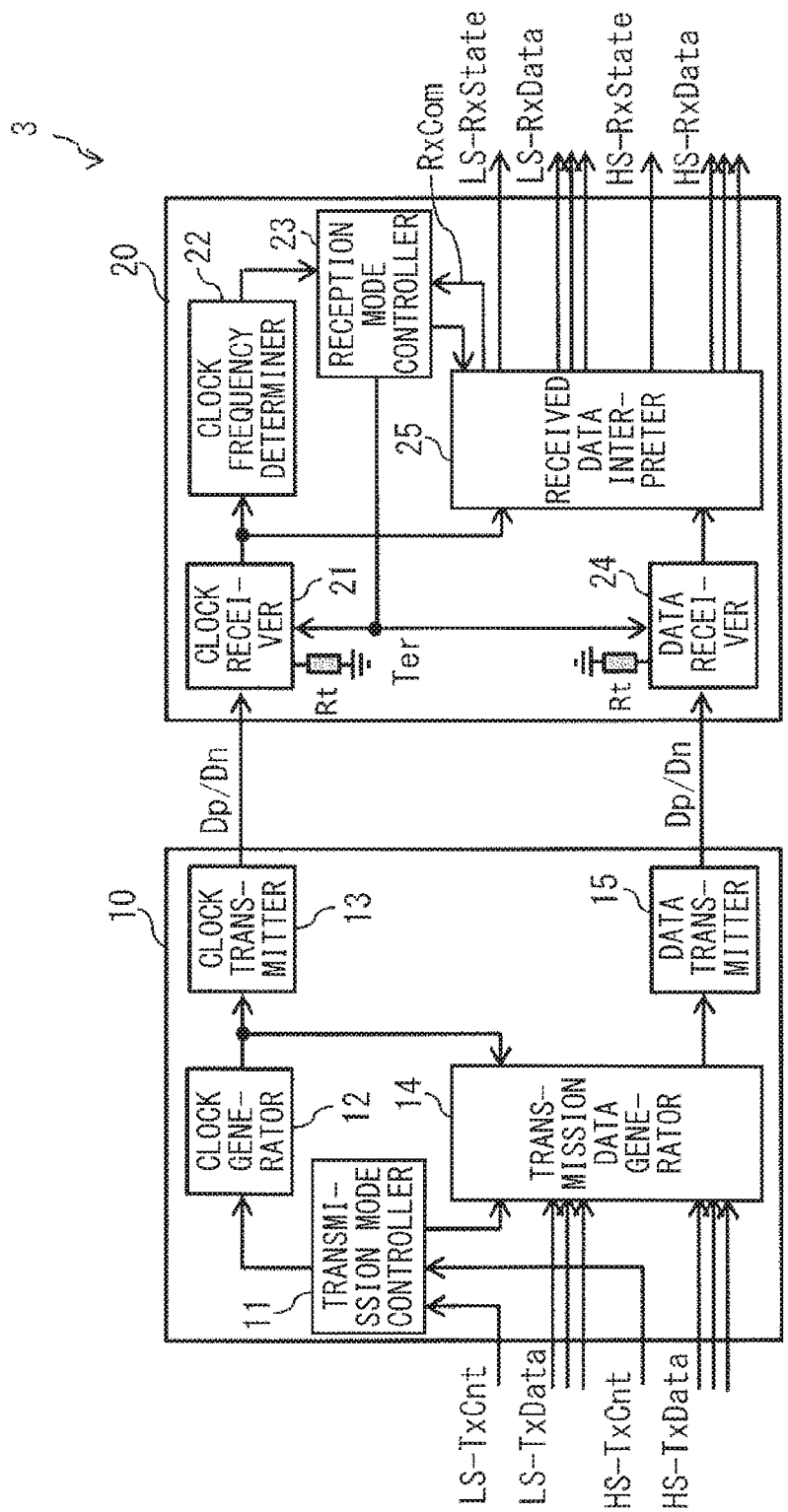

[FIG. 11]
HIGH-SPEED DATA TRANSFER
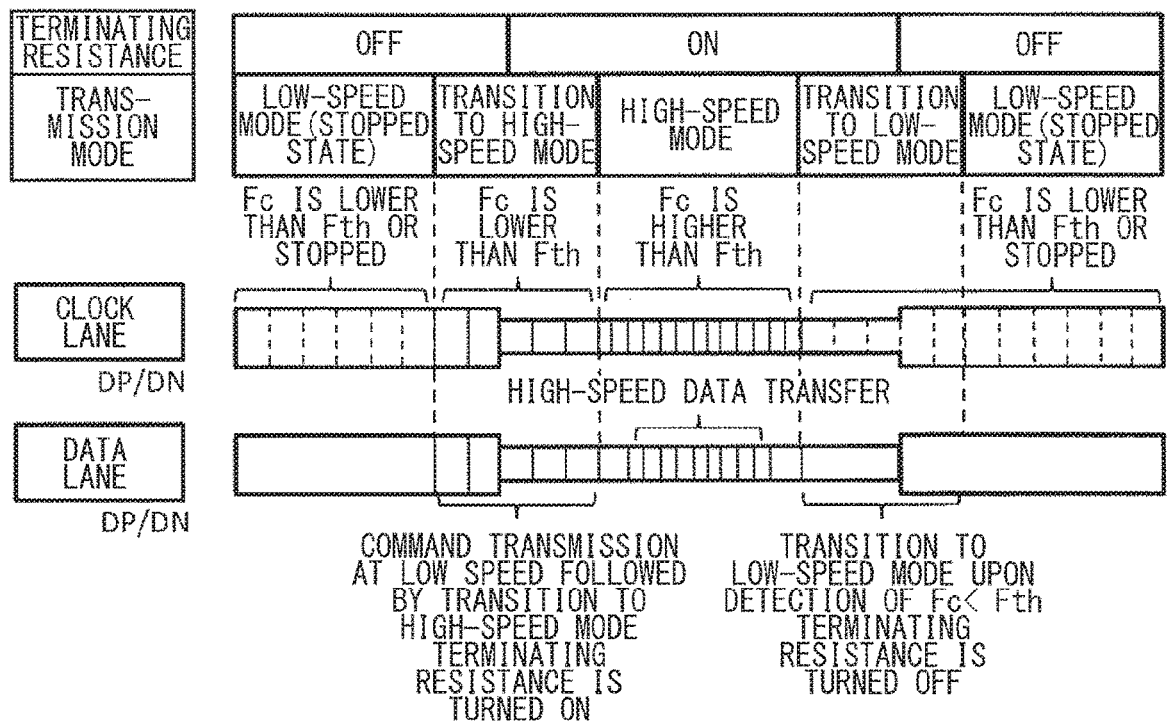
[FIG. 12]
LOW-SPEED DATA TRANSFER
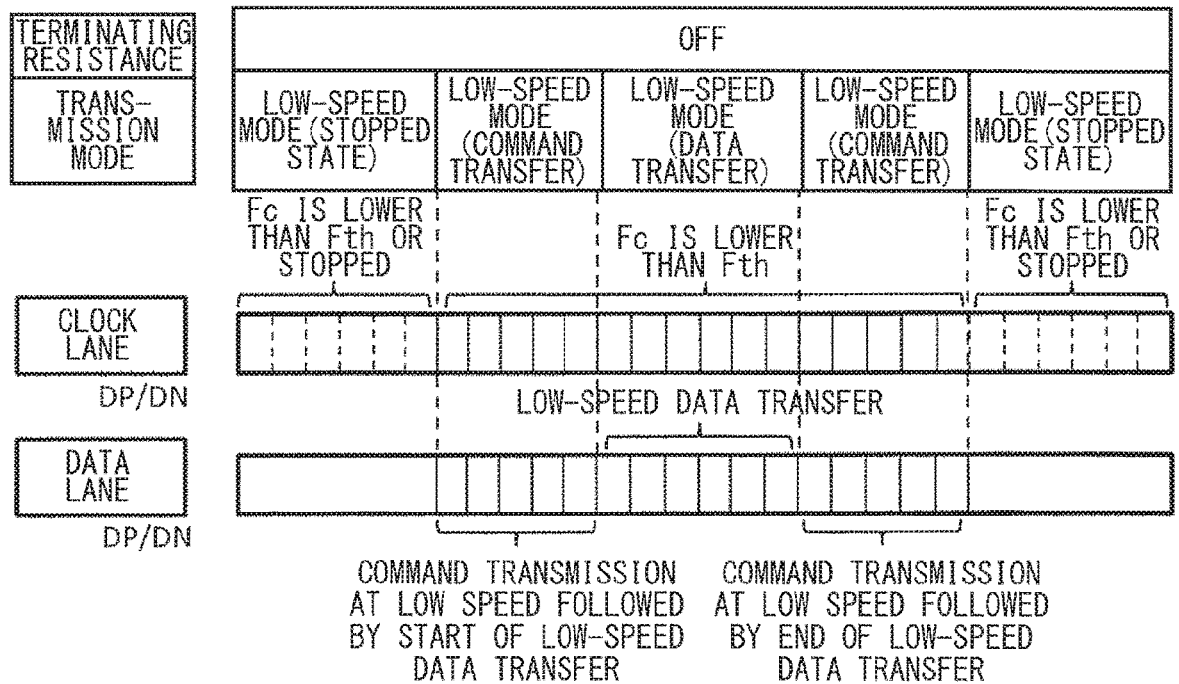

[ FIG. 13 ]
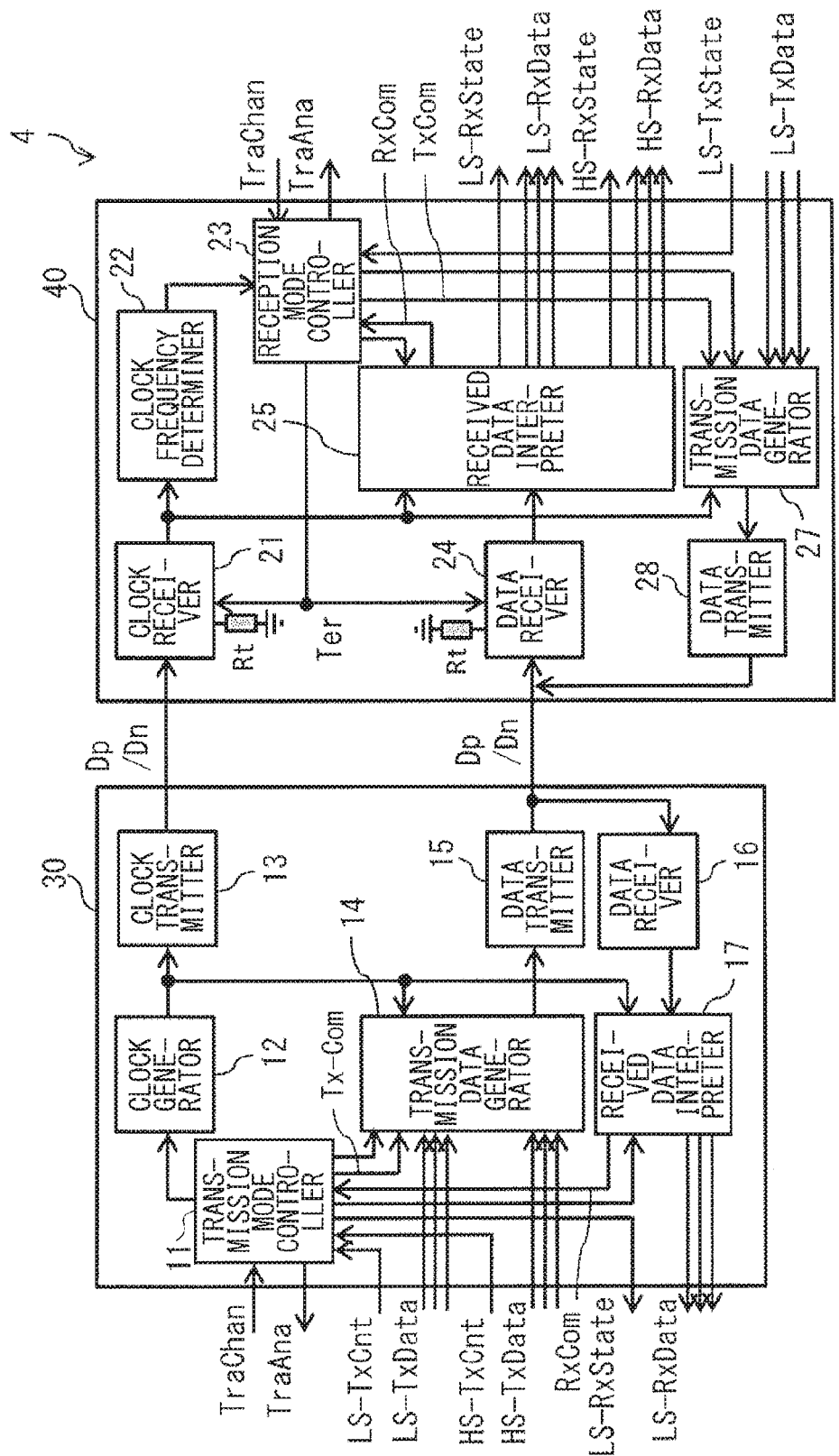

[ FIG. 14 ]
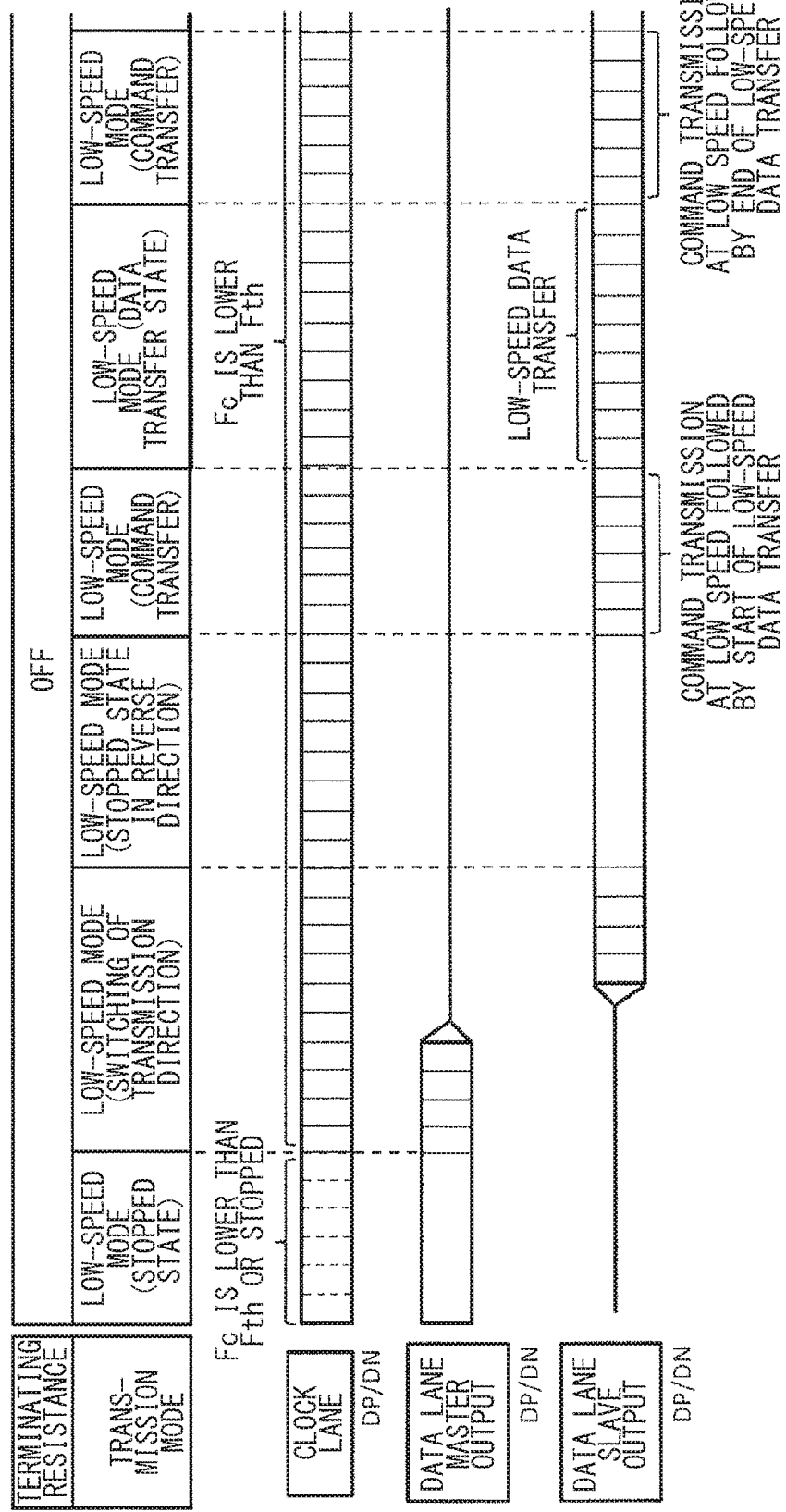

[FIG. 15]
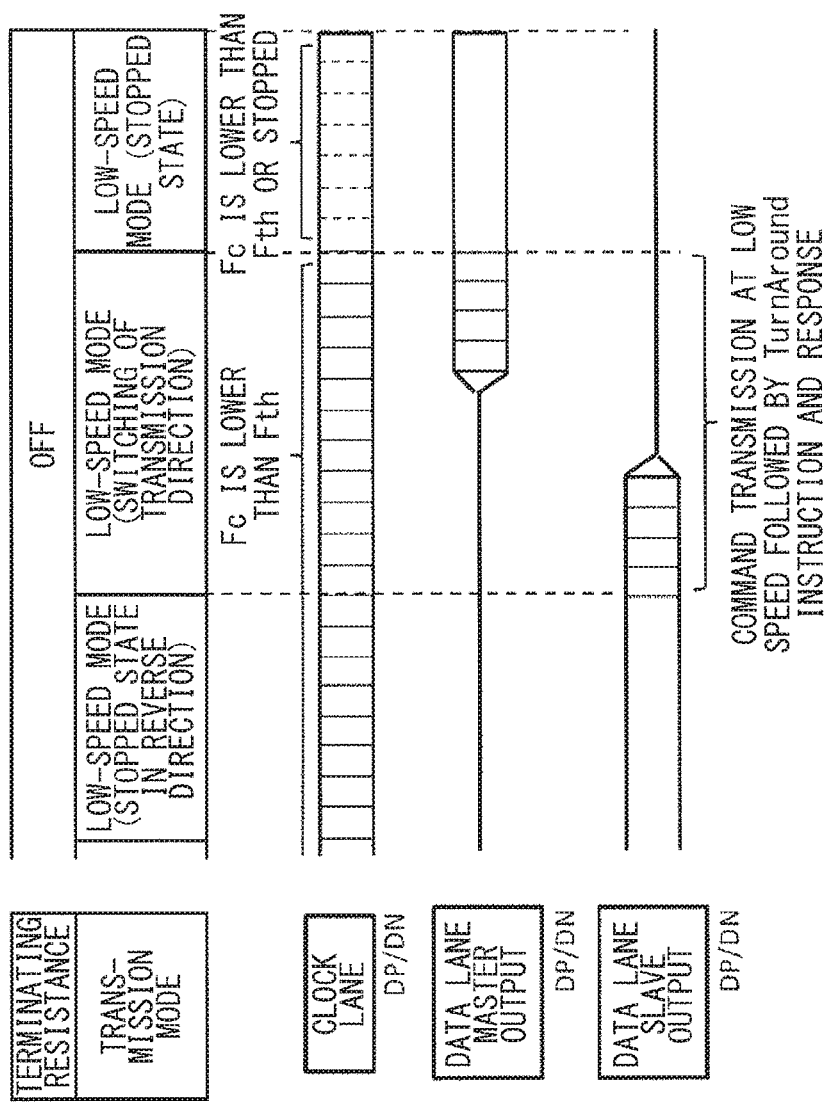

[ FIG. 16 ]
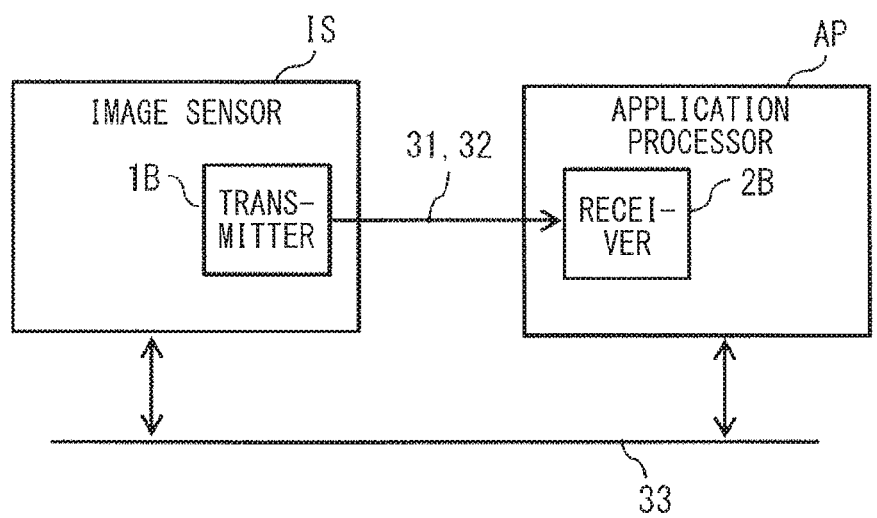

[ FIG. 17 ]
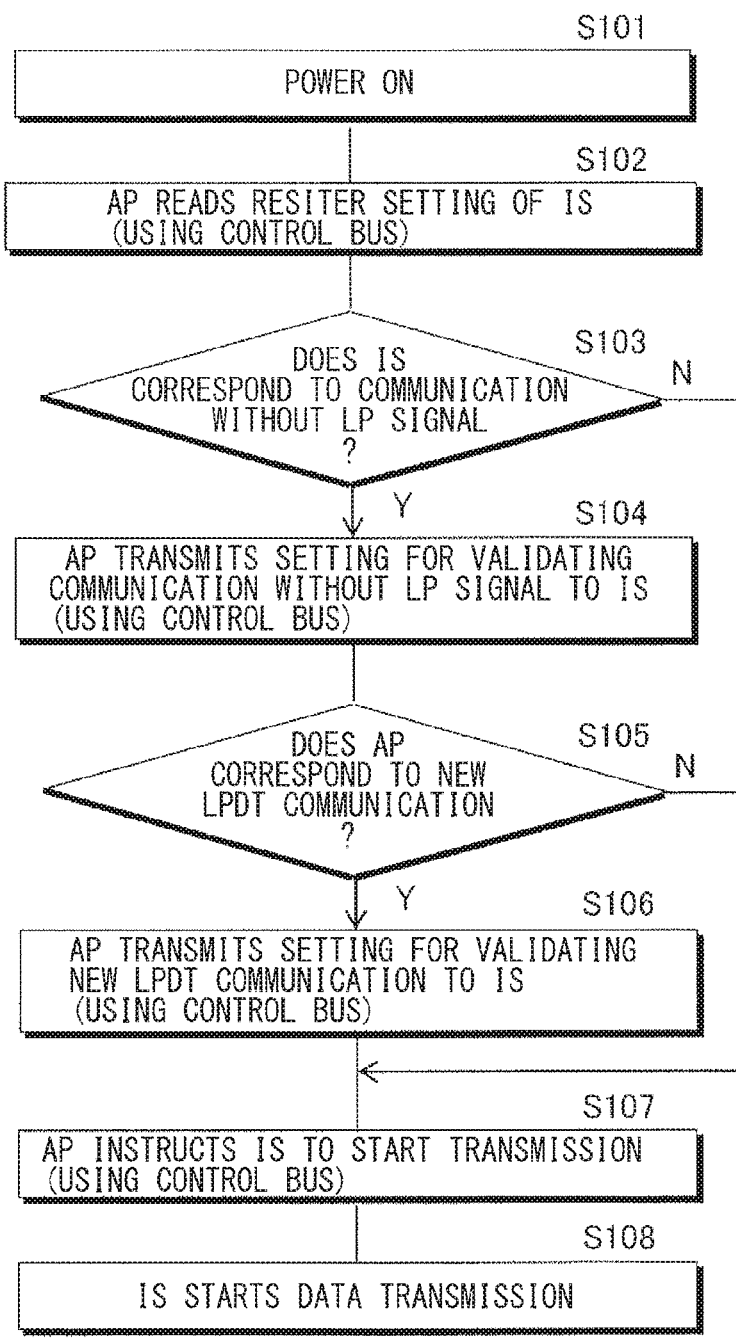

[ FIG. 18 ]
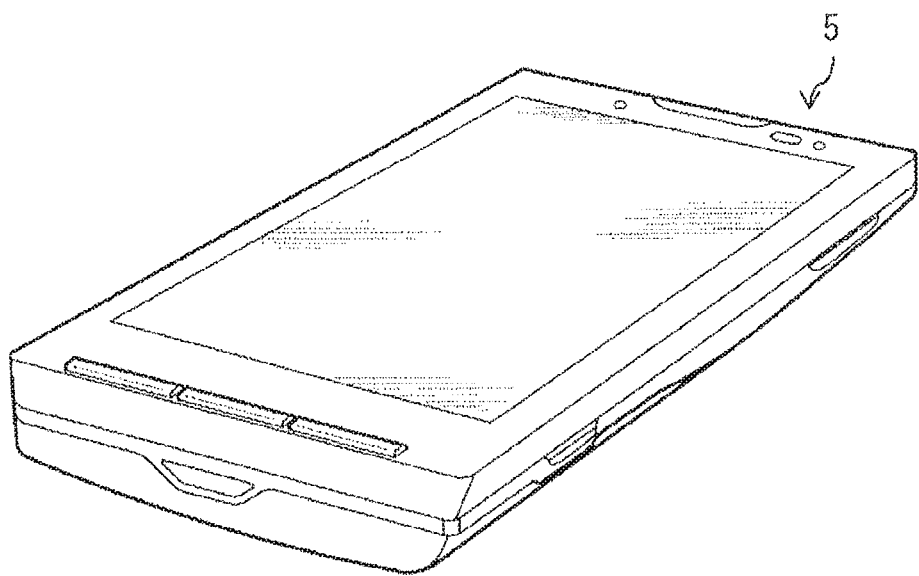

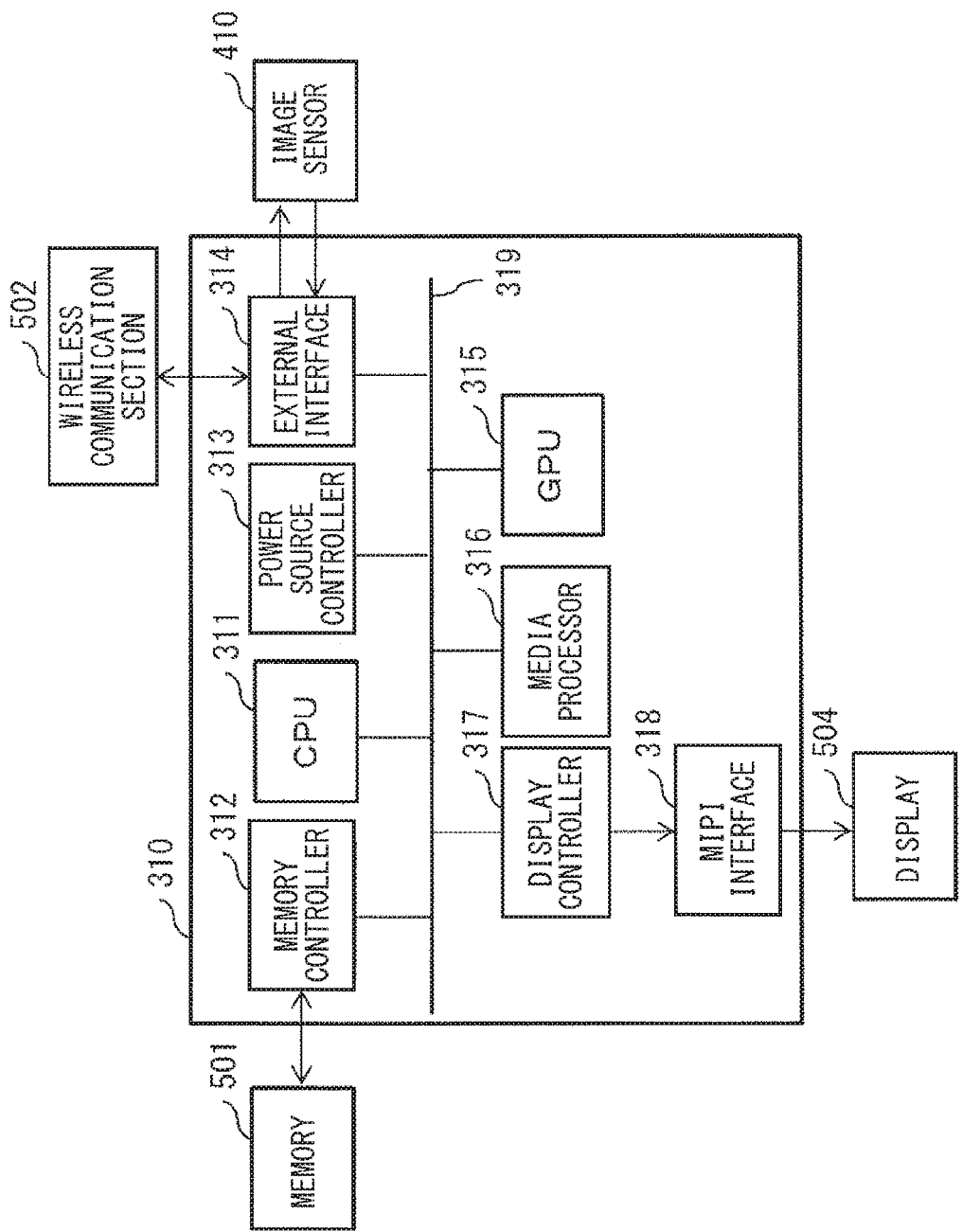
[ FIG. 19 ]

[ FIG. 20 ]
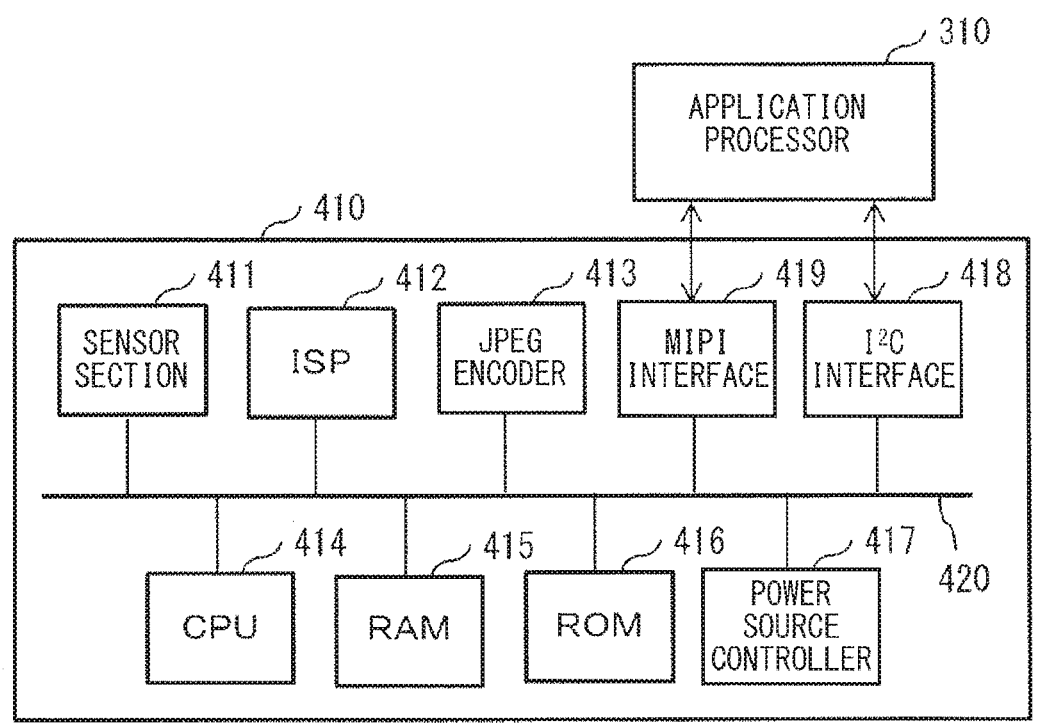

[ FIG. 21 ]
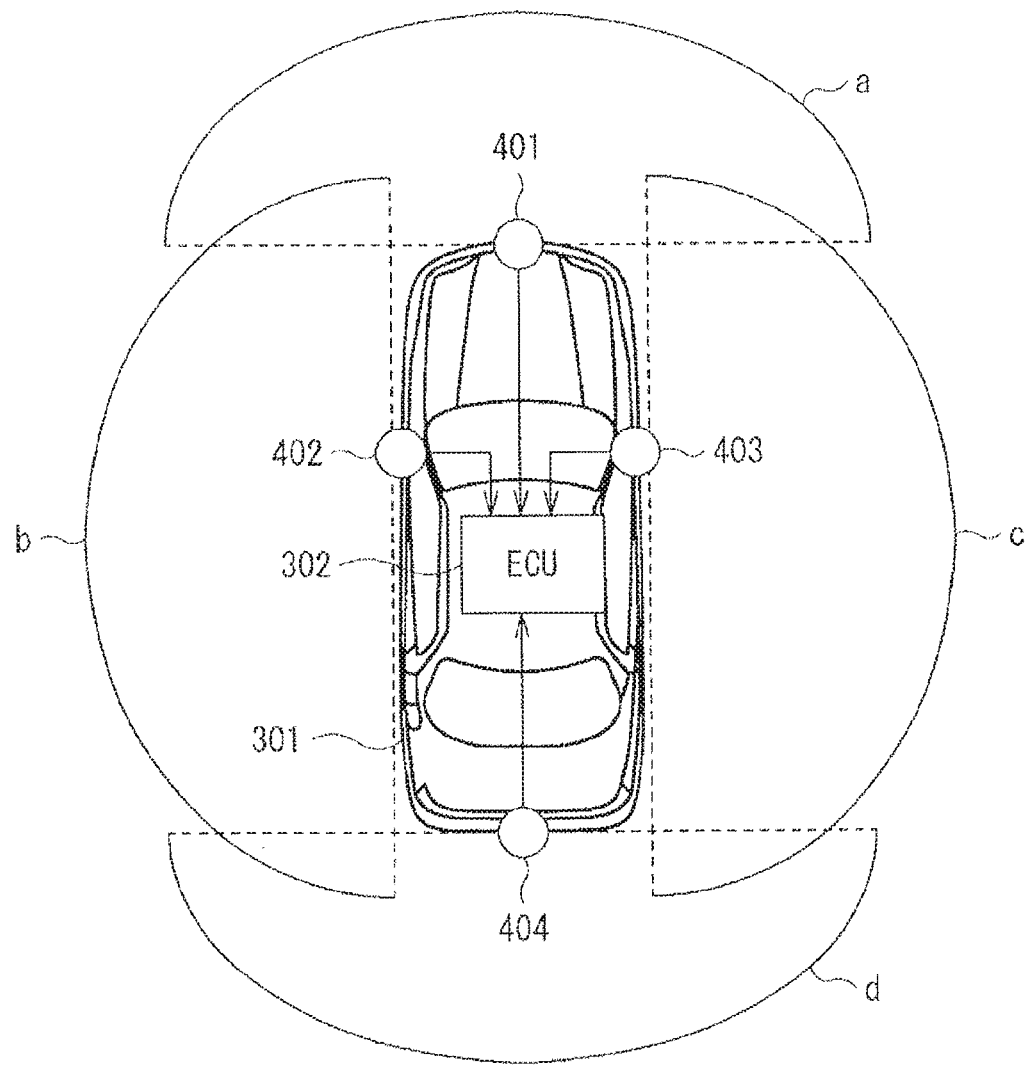
[ FIG. 22 ]
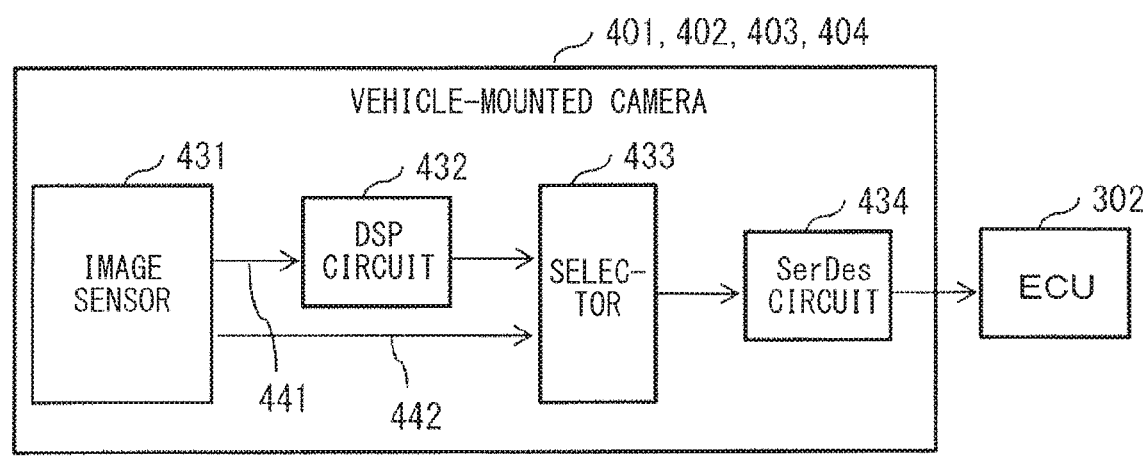

COMMUNICATION SYSTEM AND COMMUNICATION METHOD

TECHNICAL FIELD

The disclosure relates to a communication system and a communication method that are applied to transmission of a data signal.

BACKGROUND ART

In recent years, in association with increasing capacity of image data handled by mobile devices such as smartphones and camera devices, higher speed and lower power consumption of data transmission in a device or between different devices have been in demand. In order to meet such demands, standardization of high-speed interface specifications has been promoted, such as C-PHY specification and D-PHY specification that have been developed as coupling interface specifications for mobile devices and camera devices by the mobile industry processor interface (MIPI) alliance. The C-PHY specification and the D-PHY specification are interface specifications for communication protocol physical layers (physical layer: PHY). Moreover, a display serial interface (DSI) for a mobile device display or a camera serial interface (CSI) for a camera device is provided as an upper protocol layer of the C-PHY specification or the D-PHY specification. PTL 1 proposes a technique that achieves stabilized signal transmission in the D-PHY specification.

CITATION LIST

Patent Literature

PTL 1: Japanese Unexamined Patent Application Publication (Published Japanese Translation of PCT Application) No. JP2014-522204

SUMMARY OF THE INVENTION

In the C-PHY specification and the D-PHY specification described above, a high speed (High Speed: HS) differential signal is used for substantial transmission of a data signal. Further, a low power (Low Power: LP) signal is used in a blanking period of a clock signal and the data signal. The HS differential signal and the LP signal are transmitted on a common transmission path. For example, in the D-PHY specification, one transmission path (clock lane) where the clock signal is transmitted and one or a plurality of transmission paths (data lanes) where the data signal is transmitted are provided. A signal transmission period on each of the clock lane and the data lane includes a period in which transmission using the HS differential signal is performed and a period in which transmission using the LP signal is performed. On each of the clock lane and the data lane, the HS differential signal and the LP signal are transmitted on the common transmission path. However, the LP signal differs from the HS differential signal in a voltage value necessary for signal transmission. Hence, a circuit for transmission and reception of the HS differential signal and a circuit for transmission and reception of the LP signal are necessary independently, thus causing an issue of increased circuit size.

Further, such an issue may also occur similarly in a communication system in which a voltage amplitude value varies depending on transmission modes in the transmission of a data signal.

It is therefore desirable to provide a communication system and a communication method that make it possible to achieve reduction in circuit size, in the communication system in which a voltage amplitude value varies depending on transmission modes in transmission of a data signal.

A communication system according to an embodiment of the disclosure includes a transmission device and a reception device. The transmission device outputs a clock signal with a clock frequency corresponding to a transmission mode, and outputs a data signal corresponding to the transmission mode. The reception device receives the clock signal and the data signal, and determines the transmission mode on a basis of magnitude of the clock frequency of the received clock signal.

A communication method according to an embodiment of the disclosure includes (A) to (D) as follows:
(A) outputting a clock signal with a clock frequency corresponding to a transmission mode;
(B) outputting a data signal corresponding to the transmission mode;
(C) receiving the clock signal and the data signal: and
(D) determining the transmission mode on a basis of magnitude of the clock frequency of the received clock signal.

In the communication system and the communication method according to the respective embodiments of the disclosure, a clock signal with a clock frequency corresponding to a transmission mode is outputted from the transmission device, and the transmission mode is determined in the reception device on the basis of magnitude of the clock frequency of the received clock signal. This eliminates necessity of preparing a driver circuit or a receiver circuit for each magnitude of amplitude voltage values as in the case of determining the transmission mode on the basis of the amplitude voltage values of the data signal.

According to the communication system and the communication method of the respective embodiments of the disclosure, a clock signal with a clock frequency corresponding to a transmission mode is outputted from the transmission device, and the transmission mode is determined in the reception device on the basis of magnitude of the clock frequency of the received clock signal, thus making it possible to achieve reduction in circuit size in the communication system in which a voltage amplitude value varies depending on transmission modes in transmission of a data signal. It is to be noted that the effects of the disclosure are not necessarily limited to the effects described above, and may be any of the effects described in the specification.

BRIEF DESCRIPTION OF DRAWINGS

FIG. 1 illustrates an overview of a communication system according to a first embodiment of the disclosure.

FIG. 2 illustrates an example of a configuration of the communication system of FIG. 1.

FIG. 3 illustrates an example of high-speed data transfer in a communication system of FIG. 2.

FIG. 4 illustrates an example of low-speed data transfer in the communication system of FIG. 2.

FIG. 5 illustrates a modification example of the configuration of the communication system of FIG. 1.

FIG. 6 illustrates an example of low-speed data transfer in the communication system of FIG. 5.

FIG. 7 illustrates a modification example of the configuration of the communication system of FIG. 1.

FIG. 8 illustrates a modification example of the configuration of the communication system of FIG. 1.

FIG. 9 illustrates an overview of a communication system according to a second embodiment of the disclosure.

FIG. 10 illustrates an overview of a communication system according to a third embodiment of the disclosure.

FIG. 11 illustrates an example of high-speed data transfer in the communication system of FIG. 10.

FIG. 12 illustrates an example of low-speed data transfer in the communication system of FIG. 10.

FIG. 13 illustrates an overview of a communication system according to a fourth embodiment of the disclosure.

FIG. 14 illustrates an example of bidirectional communication in the communication system of FIG. 10.

FIG. 15 illustrates an example of the bidirectional communication subsequent to FIG. 13.

FIG. 16 illustrates an application example of the above-described communication system.

FIG. 17 illustrates an example of a data transmission processing in the application example illustrated in FIG. 16.

FIG. 18 illustrates an example of an appearance configuration of a smartphone to which the above-described communication system is applied.

FIG. 19 illustrates a configuration example of an application processor to which the above-described communication system is applied.

FIG. 20 illustrates a configuration example of an image sensor to which the above-described communication system is applied.

FIG. 21 illustrates an installation example of a vehicle-mounted camera to which the above-described communication system is applied.

FIG. 22 illustrates a configuration example in which the above-described communication system is applied to the vehicle-mounted camera.

MODES FOR CARRYING OUT THE INVENTION

Hereinafter, some embodiments of the disclosure are described in detail with reference to drawings. It is to be noted that the description is given in the following order.
1. First Embodiment
2. Modification Examples of First Embodiment
3. Second Embodiment
4. Third Embodiment
5. Fourth Embodiment
6. Application Examples 1. First Embodiment

[Configuration]

First, description is given of a communication system 1 according to a first embodiment of the disclosure. FIG. 1 illustrates an overview of the communication system 1. The communication system 1 is applied to transmission of a data signal and a clock signal, and includes a transmitter 10 (a transmission device) and a receiver 20 (a reception device). The communication system 1 includes a clock lane CL that straddles the transmitter 10 and the receiver 20 to transmit the clock signal and a data lane DL that straddles the transmitter 10 and the receiver 20 to transmit the data signal such as image data. It is to be noted that, while FIG. 1 illustrates an example in which one data lane DL is provided, a plurality of data lanes DL may be provided.

The transmitter 10 includes a digital transmitter circuit and an analog transmitter circuit. The receiver 20 includes a digital receiver circuit and an analog receiver circuit. For example, a 16-bit or 8-bit parallel signal is transmitted between the digital transmitter circuit and the analog transmitter circuit. Further, the 16-bit or 8-bit parallel signal is transmitted between the digital receiver circuit and the analog receiver circuit. In the clock lane CL, the analog transmitter circuit and the analog receiver circuit are coupled to each other by a clock signal line that transmits a differential clock signal. In the data lane DL, the analog transmitter circuit and the analog receiver circuit are coupled to each other by a data signal line that transmits a differential data signal. The clock signal line and the data signal line each include a pair of positive signal line Dp and a negative signal line Dn that transmit a differential signal. For example, a 1-bit serial signal is transmitted to each of the clock signal line and the data signal line.

The transmitter 10 includes a clock transmitter circuit 110 and a data transmitter circuit 120. The receiver 20 includes a clock receiver circuit 210 and a data receiver circuit 220. In the clock lane CL, the clock transmitter circuit 110 and the clock receiver circuit 210 are coupled to each other by the above-described clock signal line. In the data lane DL, the data transmitter circuit 120 and the data receiver circuit 220 are coupled to each other by the above-described clock signal line. The clock transmitter circuit 110 is a differential signal transmitter circuit that generates a differential clock signal as the clock signal and outputs the generated differential clock signal to the clock signal line. It is to be noted that the clock transmitter circuit 110 may be a ternary signal transmitter circuit that outputs a ternary level signal. The data transmitter circuit 120 is a differential signal transmitter circuit that generates a differential data signal as the data signal and outputs the generated differential data signal to the data signal line. It is to be noted that the data transmitter circuit 120 may be the ternary signal transmitter circuit that outputs a ternary level signal. The clock receiver circuit 210 is a differential signal receiver circuit that receives the differential clock signal as the clock signal via the clock signal line and performs a predetermined processing on the received differential clock signal. It is to be noted that the clock receiver circuit 210 may be a ternary signal receiver circuit that receives a ternary level signal. The data receiver circuit 220 is a differential signal receiver circuit that receives the differential data signal as the data signal via the data signal line and performs a predetermined processing on the received differential data signal. It is to be noted that the data receiver circuit 220 may be the ternary signal receiver circuit that receives a ternary level signal.

FIG. 2 illustrates an example of a configuration of the communication system 1. The communication system 1 illustrated in FIG. 2 represents the communication system 1 illustrated in FIG. 1 by a functional block.

The transmitter 10 includes, in the clock lane CL, a transmission mode controller 11, a clock generator 12, and a clock transmitter 13. The transmitter 10 includes, in the data lane DL, a transmission data generator 14 and a data transmitter 15. The transmission mode controller 11 decides a transmission mode in accordance with an instruction from an upper layer (e.g., a high-speed transmission control signal HS-TxCnt or a low-speed transmission control signal LS-TxCnt). The transmission mode controller 11 further performs a control corresponding to the decided transmission mode, on the clock generator 12 and the transmission data generator 14. The clock generator 12 generates a clock signal with a clock frequency Fc corresponding to a transmission mode in accordance with an instruction of the transmission mode controller 11. The clock generator 12 outputs the generated clock signal to the clock transmitter 13 and the transmission data generator 14. The clock transmitter 13 outputs the clock signal generated by the clock generator 12 to the clock signal line. In other words, the clock transmitter 13 outputs the clock signal generated by the clock generator 12 to a clock receiver 21 via the clock signal line.

The transmission data generator 14 performs, in accordance with the instruction of the transmission mode controller 11, various processings such as communication protocol control, decoding of data inputted from an upper layer, insertion of a control command, and parallel serial conversion, on an inputted data signal (e.g., high-speed transmission data HS-TxData or low-speed transmission data LS-TxData), thereby generating a data signal. The transmission data generator 14 outputs the generated data signal to the data transmitter 15. The transmission data generator 14 switches the above-described various processings in accordance with the instruction of the transmission mode controller 11. The data transmitter 15 outputs the data signal generated by the transmission data generator 14 to a data signal line. In other words, the data transmitter 15 outputs the data signal generated by the transmission data generator 14 to a data receiver 24 via the data signal line.

The receiver 20 includes, in the clock lane CL, the clock receiver 21, a clock frequency determiner 22, and a reception mode controller 23. The receiver 20 includes, in the data lane DL, the data receiver 24 and a received data interpreter 25. The clock receiver 21 receives the clock signal outputted by the clock transmitter 13 via the clock signal line. The clock receiver 21 outputs the received clock signal to the clock frequency determiner 22 and the received data interpreter 25. The clock frequency determiner 22 detects (or determines) the clock frequency Fc from the inputted clock signal. The clock frequency determiner 22 outputs the clock frequency Fc obtained from the detection (or the determination) to the reception mode controller 23. The reception mode controller 23 determines a transmission mode on the basis of a result of comparison between the received clock frequency Fc and one or a plurality of reference frequencies Fth. A circuit that performs determination of the transmission mode is configured by a typical pulse counter, etc., for example. Here, suppose that a high-speed mode having a relatively fast transmission speed and a low-speed mode having a relatively slow transmission speed are set as the transmission modes. In this situation, when the clock frequency Fc is higher than the predetermined reference frequency Fth, the reception mode controller 23 determines that the transmission mode is in the high-speed mode. When the clock frequency Fc is lower than the predetermined reference frequency Fth, the reception mode controller 23 determines that the transmission mode is in the low-speed mode. The reception mode controller 23 outputs information on the transmission mode obtained through the determination to the received data interpreter 25.

The data receiver 24 receives the data signal outputted from the data transmitter 15 via the data signal line. The data receiver 24 outputs the received data signal to the received data interpreter 25. The received data interpreter 25 performs various processings such as serial parallel conversion, detection of a control command, decoding of signal data, and communication protocol control, on an inputted data signal on the basis of an inputted clock signal and inputted information on the transmission mode, thereby generating a data signal and a reception state notification signal that are to be provided to a subsequent stage. The received data interpreter 25 switches the above-described various processings in accordance with an instruction (transmission mode, etc.) from the reception mode controller 23. The received data interpreter 25 outputs the generated data signal (e.g., high-speed reception data HS-RxData or low-speed reception data LS-RxData) and the generated reception state notification signal (a high-speed reception state notification signal HS-RxState or a low-speed reception state notification signal LS-RxState) to a circuit of a subsequent stage.

[High-Speed Data Transfer]

FIG. 3 illustrates an example of high-speed data transfer in the communication system 1. Suppose that the clock frequency determiner 22 detects (or determines) that the clock frequency Fc is lower than the reference frequency Fth or that the clock signal is stopped. In this situation, the reception mode controller 23 determines that the transmission mode is in the "low-speed mode". In a case where the transmission mode is in the "low-speed mode", when there is no input of a data signal from the data receiver 24, the received data interpreter 25 outputs no data signal to the data lane DL.

Suppose that the clock frequency determiner 22 detects (or determines) that the clock frequency Fc becomes higher than the reference frequency Fth. In this situation, the reception mode controller 23 determines that the transmission mode is making a transition from the "low-speed mode" to the "high-speed mode". It is to be noted that the transmission mode in this situation is handled as the "high-speed mode". In a case where the transmission mode is making a transition from the "low-speed mode" to the "high-speed mode", the received data interpreter 25 observes the transition of the transmission mode on the basis of the clock signal from the clock receiver 21 and the data signal from the data receiver 24. Specifically, the received data interpreter 25 determines, on the basis of transition of a combination of the clock signal from the clock receiver 21 and the data signal from the data receiver 24, whether the transmission mode is in the middle of actually making a transition from the "low-speed mode" to the "high-speed mode", or the transition from the "low-speed mode" to the "high-speed mode" has been completed to cause the transmission mode to be shifted to the "high-speed mode". In a case where the above-described transition of the combination indicates that the transmission mode has been shifted to the "high-speed mode" as a result, the received data interpreter 25 determines that the transmission mode is in the "high-speed mode". In this situation, when a data signal is inputted from the data receiver 24, the received data interpreter 25 transfers, on the data lane DL, the inputted data signal at the "high-speed mode".

Suppose that the clock frequency determiner 22 detects (or determines) that the clock frequency Fc becomes lower than the reference frequency Fth. In this situation, the reception mode controller 23 determines that the transmission mode is making a transition from the "high-speed mode" to the "low-speed mode". It is to be noted that the transmission mode in this situation is handled as the "low-speed mode". In a case where the transmission mode is making a transition from the "high-speed mode" to the "low-speed mode", the received data interpreter 25 observes the transition of the transmission mode on the basis of the clock signal from the clock receiver 21 and the data signal from the data receiver 24. Specifically, the received data interpreter 25 determines, on the basis of the transition of the combination of the clock signal from the clock receiver 21 and the data signal from the data receiver 24, whether the transmission mode is in the middle of actually making a transition from the "high-speed mode" to the "low-speed mode", or the transition from the "high-speed mode" to the "low-speed mode" has been completed to cause the transmission mode to be shifted to the "low-speed mode". In a case where the above-described transition of the combination indicates that the transmission mode has been shifted to the "low-speed mode" as a result, the received data interpreter 25 determines that the transmission mode is in the "low-speed mode". In this situation, when there is no input of a data signal from the data receiver 24, the received data interpreter 25 outputs no data signal to the data lane DL.

[Low-Speed Data Transfer]

FIG. 4 illustrates an example of low-speed data transfer in the communication system 1. Suppose that the clock frequency determiner 22 detects (or determines) that the clock frequency Fc is lower than the reference frequency Fth or that the clock signal is stopped. In this situation, the reception mode controller 23 determines that the transmission mode is in the "low-speed mode". In a case where the transmission mode is in the "low-speed mode", when there is no input of a data signal from the data receiver 24, the received data interpreter 25 outputs no data signal to the data lane DL. In a case where the transmission mode is in the "low-speed mode", when there is an input of a data signal from the data receiver 24, the received data interpreter 25 transfers, on the data lane DL, the inputted data signal at the "low-speed mode".

[Effects]

Description is given next of effects of the communication system 1 of the present embodiment.

A communication system in which a voltage amplitude value varies depending on transmission modes in transmission of a data signal has been utilized. In such a communication system, types of transmission modes have been determined by detecting the voltage amplitude value. However, such a determination method involves preparing a driver circuit or a receiver circuit for each magnitude of amplitude voltage values, causing an issue in which a circuit size is likely to be increased.

In the communication system 1 of the present embodiment, however, a clock signal with the clock frequency Fc corresponding to a transmission mode is outputted from the transmitter 10, and the transmission mode is determined in the receiver 20 on the basis of magnitude of the clock frequency Fc of the received clock signal. This eliminates the necessity of preparing a circuit that detects the amplitude voltage value for each magnitude of the amplitude voltage values as in the case of determining the transmission mode on the basis of the amplitude voltage values of the data signal. This therefore makes it possible to achieve reduction in circuit size in the communication system in which the voltage amplitude value varies depending on transmission modes in the transmission of the data signal.

Further, in the present embodiment, the transmission mode is determined in the receiver 20 on the basis of the result of the comparison between the clock frequency Fc and the one or a plurality of reference frequencies Fth. A circuit that performs such a determination may be configured by a typical pulse counter, etc. Accordingly, separately providing the circuit that performs such a determination does not prevent the reduction in circuit size.

Further, the communication system 1 of the present embodiment is also applicable to the high-speed interface specifications (e.g., the C-PHY specification and the D-PHY specification). Accordingly, it is also possible, in such high-speed interface specifications, to achieve the reduction in circuit size.

2. Modification Examples of First Embodiment

Modification Example A

FIG. 5 illustrates a modification example of the configuration of the communication system 1 of the foregoing embodiment. In the communication system 1 illustrated in FIG. 5, neither the low-speed transmission control signal LS-TxCnt nor the low-speed transmission data LS-TxData is inputted to the transmitter 10. That is, the communication system 1 of the present modification example differs from the configuration of the communication system 1 of the foregoing embodiment in that neither the low-speed transmission control signal LS-TxCnt nor the low-speed transmission data LS-TxData is inputted from the upper layer. Further, in the communication system illustrated in FIG. 5, neither the low-speed reception state notification signal LS-RxState nor the low-speed reception data LS-RxData is outputted from the receiver 20. That is, the communication system 1 of the present modification example differs from the configuration of the communication system 1 of the foregoing embodiment in that neither the low-speed reception state notification signal LS-RxState nor the low-speed reception data LS-RxData is outputted to a subsequent stage of the communication system 1. Therefore, in the following, the low-speed data transfer is mainly described.

[Low-Speed Data Transfer]

FIG. 6 illustrates an example of low-speed data transfer in the communication system 1 of the present modification example. Suppose that the clock frequency determiner 22 detects (or determines) that the clock frequency Fc is lower than the reference frequency Fth or that the clock signal is stopped. In this situation, the reception mode controller 23 determines that the transmission mode is in the "low-speed mode". In a case where the transmission mode is in the "low-speed mode", when there is no input of a data signal from the data receiver 24, the received data interpreter 25 outputs no data signal to the data lane DL. In a case where the transmission mode is in the "low-speed mode", when there is an input of a data signal including a control command from the data receiver 24, the received data interpreter 25 transfers, on the data lane DL, the control command included in the inputted data signal at the "low-speed mode". It is to be noted that the control command is generated at the transmission data generator 14 in the receiver 10, and is not inputted from the upper layer.

Similarly to the foregoing embodiment, in the communication system 1 of the present modification example, a clock signal with the clock frequency Fc corresponding to a transmission mode is outputted from the transmitter 10, and the transmission mode is determined in the receiver 20 on the basis of magnitude of the clock frequency Fc of the received clock signal. This therefore makes it possible to achieve reduction in circuit size in the communication system in which the voltage amplitude value varies depending on transmission modes in the transmission of the data signal.

Modification Example B

FIG. 7 illustrates a modification example of the configuration of the communication system 1 of the foregoing embodiment. The communication system 1 illustrated in FIG. 7 includes a plurality of data lanes LD. Accordingly, the communication system 1 of the present modification example differs from the configuration of the communication system 1 of the foregoing embodiment in that the plurality of data lanes LD are provided. However, similarly to the foregoing embodiment, in the communication system 1 of the present modification example, a clock signal with the clock frequency Fc corresponding to a transmission mode is outputted from the transmitter 10, and the transmission mode is determined in the receiver 20 on the basis of magnitude of the clock frequency Fc of the received clock signal, in each of the data lanes DL. This therefore makes it possible to achieve reduction in circuit size in the communication system in which the voltage amplitude value varies depending on transmission modes in the transmission of the data signal.

Modification Example C

FIG. 8 illustrates a modification example of the configuration of the communication system 1 of the foregoing embodiment. The communication system 1 illustrated in FIG. 8 includes, in the data lane LD, a plurality of data signal lines that each couple the transmitter 10 and the receiver 20 together and are each provided therebetween. Accordingly, the communication system 1 of the present modification example differs from the configuration of the communication system 1 of the foregoing embodiment in that it is possible to perform parallel transmission in the data lane LD. However, similarly to the foregoing embodiment, in the communication system 1 of the present modification example, a clock signal with the clock frequency Fc corresponding to a transmission mode is outputted from the transmitter 10, and the transmission mode is determined in the receiver 20 on the basis of magnitude of the clock frequency Fc of the received clock signal, in the data lane DL. This therefore makes it possible to achieve reduction in circuit size in the communication system in which the voltage amplitude value varies depending on transmission modes in the transmission of the data signal.

3. Second Embodiment

[Configuration]

Description is given next of a communication system 2 according to a second embodiment of the disclosure. FIG. 9 illustrates an overview of the communication system 2. The communication system 2 is applied to transmission of the data signal and the clock signal, and includes the transmitter 10 (the transmission device) and the receiver 20 (the reception device). The communication system 2 includes the data lane DL that straddles the transmitter 10 and the receiver 20 to transmit a superimposed signal in which the clock signal is superimposed on the data signal. That is, an embedded clock type serial IF is used in the communication system 2.

In the communication system 2, the transmitter 10 outputs to the data signal line the superimposed signal in which the clock signal is superimposed on the data signal. The receiver 20 receives the superimposed signal via the data signal line. The transmitter 10 is the differential signal transmitter circuit that outputs as the superimposed signal a differential superimposed signal, or the ternary signal transmitter circuit that outputs as the superimposed signal the ternary level signal. The receiver 20 is the differential signal receiver circuit that receives as the superimposed signal the differential superimposed signal, or the ternary signal receiver circuit that outputs as the superimposed signal the ternary level signal.

In the present embodiment, the clock generator 12 outputs generated clock signal to the transmission data generator 14. In accordance with the instruction of the transmission mode controller 11, the transmission data generator 14 superimposes the clock signal inputted from the clock generator 12 on inputted data signal (e.g., the high-speed transmission data HS-TxData or the low-speed transmission data LS-TxData) to thereby generate the superimposed signal.

Further, in the present embodiment, the receiver 20 includes a clock extractor 26 instead of the clock receiver 21. The clock extractor 26 accepts the superimposed signal from the data receiver 24, and extracts the clock signal or clock information related to the clock signal out of the accepted superimposed signal. The clock extractor 26 outputs the extracted clock signal or clock information to the clock frequency determiner 22. The clock frequency determiner 22 detects (or determines) a clock frequency out of the inputted clock signal or clock information.

[Effects]

In the communication system 2 of the present embodiment, the superimposed signal in which the clock signal with the clock frequency Fc corresponding to a transmission mode is superimposed on the signal data is outputted from the transmitter 10, and the transmission mode is determined in the receiver 20 on the basis of magnitude of the clock frequency Fc of the clock signal extracted from the received superimposed signal, in the data lane DL. This therefore makes it possible to achieve reduction in circuit size in the communication system in which the voltage amplitude value varies depending on transmission modes in the transmission of the data signal.

Further, in the present embodiment, the transmission mode is determined in the receiver 20 on the basis of the result of the comparison between the clock frequency Fc and the one or a plurality of reference frequencies Fth. A circuit that performs such a determination may be configured by a typical pulse counter, etc. Accordingly, separately providing the circuit that performs such a determination does not prevent the reduction in circuit size.

Further, the communication system 1 of the present embodiment is also applicable to the high-speed interface specifications (e.g., the C-PHY specification and the D-PHY specification). Accordingly, it is also possible, in such high-speed interface specifications, to achieve the reduction in circuit size.

4. Third Embodiment

[Configuration]

Next, description is given of a communication system 3 according to a third embodiment of the disclosure. FIG. 10 illustrates an overview of the communication system 3. The communication system 3 is applied to transmission of the data signal and the clock signal, and includes the transmitter 10 (the transmission device) and the receiver 20 (the reception device). The communication system 3 includes the clock lane CL that straddles the transmitter 10 and the receiver 20 to transmit the clock signal, and the data lane DL that straddles the transmitter 10 and the receiver 20 to transmit the data signal such as image data. It is to be noted that, while FIG. 10 illustrates an example in which one data lane DL is provided, a plurality of data lanes DL may be provided.

In the present embodiment, the clock receiver 21 includes a terminating resistance Rt (a second terminating resistance) coupled to the clock signal line, and a switching element that is able to turn ON/OFF coupling between the clock signal line and the terminating resistance Rt by a control signal Ter. Further, the data receiver 24 includes a terminating resistance Rt (a first terminating resistance) coupled to the data signal, and a switching element that is able to turn ON/OFF coupling between the data signal line and the terminating resistance Rt by the control signal Ter. In a case where a predetermined command is included in the data signal, the received data interpreter 25 outputs, as a received control command RxCom, the command to the mode controller 23. In a case where the transmission mode is in the "low-speed mode", when the predetermined command is included in the data signal, the reception mode controller 23 turns ON the terminating resistance Rt (the first terminating resistance) and the terminating resistance Rt (the second terminating resistance). Specifically, in a case where the transmission mode is in the "low-speed mode", when there is an input of a control command that turns ON the terminating resistance Rt (the first terminating resistance) and the terminating resistance Rt (the second terminating resistance), as the received control command RxCom, the reception mode controller 23 turns ON the terminating resistance Rt (the first terminating resistance) and the terminating resistance Rt (the second terminating resistance). Further, in a case where the transmission mode is in the "low-speed mode", when a predetermined command is included in the data signal, the reception mode controller 23 turns OFF the terminating resistance Rt (the first terminating resistance) and the terminating resistance Rt (the second terminating resistance). Specifically, in a case where the transmission mode is in the "low-speed mode", when there is an input of a control command that turns OFF the terminating resistance Rt (the first terminating resistance) and the terminating resistance Rt (the second terminating resistance), as the received control command RxCom, the reception mode controller 23 turns OFF the terminating resistance Rt (the first terminating resistance) and the terminating resistance Rt (the second terminating resistance).

[High-Speed Data Transfer]

FIG. 11 illustrates an example of high-speed data transfer in the communication system 3. Suppose that the clock frequency determiner 22 detects (or determines) that the clock frequency Fc is lower than the reference frequency Fth or that the clock signal is stopped. In this situation, the reception mode controller 23 determines that the transmission mode is in the "low-speed mode". In a case where the transmission mode is in the "low-speed mode", when there is no input of a data signal from the data receiver 24, the received data interpreter 25 outputs no data signal to the data lane DL.

Suppose that the clock frequency determiner 22 detects (or determines) that the clock frequency Fc is lower than the reference frequency Fth. Further, suppose that there has been an input of the control command (the control command RxCom) that turns ON the terminating resistance Rt (the first terminating resistance) and the terminating resistance Rt (the second terminating resistance), as the received control command RxCom. In this situation, the reception mode controller 23 determines that the transmission mode is making a transition from the "low-speed mode" to the "high-speed mode". It is to be noted that the transmission mode in this situation is handled as the "low-speed mode". Further, the reception mode controller 23 causes the terminating resistance Rt (the first terminating resistance) and the terminating resistance Rt (the second terminating resistance) to be shifted from OFF to ON.

Suppose that the clock frequency determiner 22 detects (or determines) that the clock frequency Fc becomes higher than the reference frequency Fth. In this situation, the reception mode controller 23 determines that the transmission mode is in the "high-speed mode". In a case where the transmission mode is in the "high-speed mode", when the data signal is inputted from the data receiver 24, the received data interpreter 25 transfers, on the data lane DL, the inputted data signal at the "high-speed mode".

Suppose that the clock frequency determiner 22 detects (or determines) that the clock frequency Fc becomes lower than the reference frequency Fth. In this situation, the reception mode controller 23 determines that the transmission mode is making a transition from the "high-speed mode" to the "low-speed mode". It is to be noted that the transmission mode in this situation is handled as the "low-speed mode". In a case where the transmission mode is making a transition from the "high-speed mode" to the "low-speed mode", the received data interpreter 25 observes the transition of the transmission mode on the basis of the clock signal from the clock receiver 21 and the data signal from the data receiver 24. Specifically, the received data interpreter 25 determines, on the basis of transition of a combination of the clock signal from the clock receiver 21 and the data signal from the data receiver 24, whether the transmission mode is in the middle of actually making a transition from the "high-speed mode" to the "low-speed mode", or the transition from the "high-speed mode" to the "low-speed mode" has been completed to cause the transmission mode to be shifted to the "low-speed mode".

In a case where the above-described transition of the combination indicates that the transmission mode is in the middle of actually making a transition from the "high-speed mode" to the "low-speed mode" as a result, the received data interpreter 25 determines that the transmission mode is in the middle of making the transition from the "high-speed mode" to the "low-speed mode". In this situation, suppose that there has been an input of the control command (the control command RxCom) that turns OFF the terminating resistance Rt (the first terminating resistance) and the terminating resistance Rt (the second terminating resistance). In this case, the reception mode controller 23 causes the terminating resistance Rt (the first terminating resistance) and the terminating resistance Rt (the second terminating resistance) to be shifted from ON to OFF. Meanwhile, in a case where the above-described transition of the combination indicates that the transmission mode has been shifted to the "low-speed mode", the received data interpreter 25 determines that the transmission mode is in the "low-speed mode". In this situation, when there is no input of a data signal from the data receiver 24, the received data interpreter 25 outputs no data signal to the data lane DL.

[Low-Speed Data Transfer]

FIG. 12 illustrates an example of low-speed data transfer in the communication system 3. Suppose that the clock frequency determiner 22 detects (or determines) that the clock frequency Fc is lower than the reference frequency Fth or that the clock signal is stopped. In this situation, the reception mode controller 23 determines that the transmission mode is in the "low-speed mode". In a case where the transmission mode is in the "low-speed mode", when there is no input of a data signal from the data receiver 24, the received data interpreter 25 outputs no data signal to the data lane DL.

In a case where the transmission mode is in the "low-speed mode", when there is an input of a data signal including a control command from the data receiver 24, the received data interpreter 25 extracts the control command from the inputted data signal, and transfers, on the data lane DL, the extracted control command at the "low-speed mode". Further, in a case where the transmission mode is in the "low-speed mode", when there is an input of a data signal from the data receiver 24, the received data interpreter 25 transfers, on the data lane DL, the inputted data signal at the "low-speed mode".

[Effects]

Next, description is given of effects of the communication system 3 of the present embodiment. In the communication system 3 of the present embodiment, a clock signal with the clock frequency Fc corresponding to a transmission mode is outputted from the transmitter 10, and the transmission mode is determined in the receiver 20 on the basis of magnitude of the clock frequency Fc of the received clock signal. This eliminates the necessity of preparing a driver circuit or a receiver circuit for each magnitude of amplitude voltage values as in the case of determining the transmission mode on the basis of the amplitude voltage values of the data signal. This therefore makes it possible to achieve reduction in circuit size in the communication system in which the voltage amplitude value varies depending on transmission modes in the transmission of the data signal.

Further, in the present embodiment, the transmission mode is determined in the receiver 20 on the basis of the result of the comparison between the clock frequency Fc and the one or a plurality of reference frequencies Fth. A circuit that performs such a determination may be configured by a typical pulse counter, etc. Accordingly, even in a case of separately providing the circuit that performs such a determination, the reduction in circuit size is not prevented.

Further, the communication system 3 of the present embodiment is also applicable to the high-speed interface specifications (e.g., the C-PHY specification and the D-PHY specification). Accordingly, separately providing the circuit that performs such a determination does not prevent the reduction in circuit size.

Further, in the present embodiment, in a case where the transmission mode is in the middle of making a transition from the "low-speed mode" to the "high-speed mode" (the transmission mode is handled as the "low-speed mode"), when a predetermined command is included in the data signal, the terminating resistance Rt (the first terminating resistance) and the terminating resistance Rt (the second terminating resistance) are turned ON. This causes a high-speed clock signal or data signal to be transmitted in such a state that the terminating resistance Rt (the first terminating resistance) and the terminating resistance Rt (the second terminating resistance) are turned ON. Hence, it is possible to suppress generation of unnecessary radiation.

It is to be noted that, in the communication system 2 of the foregoing second embodiment, the data receiver 24 may include the terminating resistance Rt (the first terminating resistance) coupled to the data signal line, and the switching element that is able to turn ON/OFF coupling between the data signal line and the terminating resistance Rt by the control signal Ter. Further, in a case where the transmission mode is in the middle of making a transition from the "low-speed mode" to the "high-speed mode", when a predetermined command is included in the data signal, the reception mode controller 23 may turn ON the terminating resistance Rt (the first terminating resistance). Furthermore, in a case where the transmission mode is in the middle of making a transition from the "high-speed mode" to the "low-speed mode", when a predetermined command is included in the data signal, the reception mode controller 23 may turn OFF the terminating resistance Rt (the first terminating resistance). Even in this case, it is possible to suppress generation of unnecessary radiation.

5. Fourth Embodiment

[Configuration]

Next, description is given of a communication system 4 according to a fourth embodiment of the disclosure. FIG. 13 illustrates an overview of the communication system 4. The communication system 4 is applied to transmission of the data signal and the clock signal, and includes a master 30 (a transmission device) and a slave 40 (a reception device). The communication system 4 includes the clock lane CL that straddles the master 30 and the slave 40 to transmit the clock signal, and the data lane DL that straddles the master 30 and the slave 40 to transmit the data signal such as image data. It is to be noted that, while FIG. 13 illustrates an example in which one data lane DL is provided, a plurality of data lanes DL may be provided.

In the present embodiment, the master 30 is provided instead of the transmitter 10 and the slave 40 is provided instead of the receiver 20 in the communication system 3 of the foregoing third embodiment. The master 30 corresponds to the transmitter 10 of the foregoing third embodiment that further includes a data receiver 16 and a received data interpreter 17. In the master 30, the transmission mode controller 11 exchanges, with an upper layer, signals (a transmission direction notification signal TraAna and a transmission direction switch signal TraChan) that control a communication direction. Further, the transmission mode controller 11 outputs, to the transmission data generator 14, a control command TxCom to be transmitted.

The data receiver 16 receives a data signal outputted from a data transmitter 28 via the data signal line. The data receiver 16 outputs the received data signal to the received data interpreter 17. The received data interpreter 17 performs various processings such as serial parallel conversion, detection of a control command, decoding of signal data, and communication protocol control, on an inputted data signal on the basis of an inputted clock signal and inputted information on the transmission mode, thereby generating a data signal (the low-speed reception data LS-RxData) and the control command RxCom that are to be provided to a preceding stage. The received data interpreter 17 outputs the generated data signal (e.g., the low-speed reception data LS-RxData) to a circuit of a preceding stage, and outputs the control command RxCom to the transmission mode controller 11.

The slave 40 corresponds to the receiver 20 of the foregoing third embodiment that further includes a transmission data generator 27 and the data transmitter 28. In the slave 40, the reception mode controller 23 exchanges, with an upper layer, signals (the transmission direction notification signal TraAna and the transmission direction switch signal TrChan) that control a communication direction. Further, the reception mode controller 23 outputs, to the transmission data generator 27, the control command TxCom to be transmitted.

The transmission data generator 27 performs, in accordance with an instruction of the reception mode controller 23, various processings such as communication protocol control, decoding of data inputted from an upper layer, insertion of a control command, and parallel serial conversion, on an inputted data signal (the low-speed transmission data LS-TxData), thereby generating a data signal. The transmission data generator 27 outputs the generated data signal to the data transmitter 28. The data transmitter 28 outputs the data signal generated by the transmission data generator 27 to the data signal line. In other words, the data transmitter 28 outputs the data signal generated by the transmission data generator 27 to the data receiver 16 via the data signal line.

[Bidirectional Communication]

FIGS. 14 and 15 illustrate an example of bidirectional communication in the communication system 4. FIG. 15 illustrates an example of the communication subsequent to FIG. 14. Suppose that the transmission direction switch signal TraChan is inputted from an upper layer on side of the master 30. The transmission mode controller 11 then outputs, to the transmission data generator 14, the transmission direction switch signal TraChan as the control command TxCom to be transmitted. The transmission data generator 14 generates a data signal including the inputted transmission direction switch signal TraChan, and outputs the generated data signal to the data transmitter 15. The data transmitter 15 outputs the inputted data signal to the data receiver 24 via the data signal line at the "low-speed mode". The data receiver 24 outputs the inputted data signal to the received data interpreter 25. Upon extracting the transmission direction switch signal TraChan included in the inputted data signal, the received data interpreter 25 outputs, to the reception mode controller 23, the extracted transmission direction switch signal TraChan as the received control command RxCom. When the transmission direction switch signal TraChan is inputted as the control command RxCom, the reception mode controller 23 outputs, to an upper layer on side of the slave 40, the transmission direction switch signal TraChan as the transmission direction notification signal TraAna.

Further, the reception mode controller 23 outputs to the transmission data generator 27 a response to the effect that an input of the transmission direction switch signal TraChan has been accepted. Specifically, the reception mode controller 23 outputs to the transmission data generator 27 a signal (hereinafter, referred to as an "acceptance signal") indicating that the input of the transmission direction switch signal TraChan has been accepted, as the control command TxCom to be transmitted. The transmission data generator 27 generates a data signal including the inputted acceptance signal, and outputs the generated data signal to the data transmitter 28. The data transmitter 28 outputs the inputted data signal to the data receiver 16 via the data signal line at the "low-speed mode". The data receiver 16 outputs the inputted data signal to the received data interpreter 17. Upon extracting the acceptance signal included in the inputted data signal, the received data interpreter 17 outputs, to the transmission mode controller 11, the extracted acceptance signal as the received control command RxCom. When the acceptance signal is inputted as the control command RxCom, the transmission mode controller 11 outputs, to the upper layer on side of the master 30, the acceptance signal as a response to the effect that transmission direction switching has been completed and as the transmission direction notification signal TraAna. In this manner, the transmission direction switching is performed.

Thereafter, when the data signal (the low-speed transmission data LS-TxData) is inputted from the upper layer, etc., the transmission data generator 27 performs a predetermined processing on the data signal to thereby generate a data signal to be transmitted. The transmission data generator 27 outputs the generated data signal to the data transmitter 28. The data transmitter 28 outputs the inputted data signal to the data receiver 16 via the data signal line at the "low-speed mode". The data receiver 16 outputs the inputted data signal to the received data interpreter 17. The received data interpreter 17 outputs, to the upper layer, the inputted data signal as the low-speed reception data LS-RxData. In this manner, data transmission from the slave 40 to the master 30 is performed.

After the data transmission from the slave 40 to the master 30 has been completed, transmission direction switching (TurnAround processing) is performed through a procedure reverse to that of the foregoing. Suppose that the transmission direction switch signal TraChan is inputted from the upper layer on side of the slave 40. The reception mode controller 23 then outputs, to the transmission data generator 27, the transmission direction switch signal TraChan as the control command TxCom to be transmitted. The transmission data generator 27 generates a data signal including the inputted transmission direction switch signal TraChan, and outputs the generated data signal to the data transmitter 28. The data transmitter 28 outputs the inputted data signal to the data receiver 16 via the data signal line at the "low-speed mode". The data receiver 16 outputs the inputted data signal to the received data interpreter 17. Upon extracting the transmission direction switch signal TraChan included in the inputted data signal, the received data interpreter 17 outputs, to the transmission mode controller 11, the extracted transmission direction switch signal TraChan as the received control command RxCom. When the transmission direction switch signal TraChan is inputted as the control command RxCom the transmission mode controller 11 outputs, to the upper layer on side of the master 30, the transmission direction switch signal TraChan as the transmission direction notification signal TraAna.

Further, the transmission mode controller 11 outputs to the transmission data generator 14 a response to the effect that an input of the transmission direction switch signal TraChan has been accepted. Specifically, the reception mode controller 23 outputs to the transmission data generator 14 a signal indicating that the input of the transmission direction switch signal TraChan has been accepted (hereinafter, referred to as an "acceptance signal"), as the control command TxCom to be transmitted. The transmission data generator 14 generates a data signal including the inputted acceptance signal, and outputs the generated data signal to the data transmitter 15. The data transmitter 15 outputs the inputted data signal to the data receiver 24 via the data signal line at the "low-speed mode". The data receiver 24 outputs the inputted data signal to the received data interpreter 25. Upon extracting the acceptance signal included in the inputted data signal, the received data interpreter 25 outputs, to the reception mode controller 23, the extracted acceptance signal as the received control command RxCom. When the acceptance signal is inputted as the control command RxCom, the reception mode controller 23 outputs, to the upper layer on side of the slave 40, the acceptance signal as a response to the effect that the transmission direction switching has been completed and as the transmission direction notification signal TraAna. In this manner, the transmission direction is returned to the original direction.

[Effects]

In the communication system 4 of the present embodiment, similarly to the foregoing embodiments, a clock signal with the clock frequency Fc corresponding to a transmission mode is outputted from the master 30, and the transmission mode is determined in the slave 40 on the basis of magnitude of the clock frequency Fc of the received clock signal. This eliminates the necessity of preparing a driver circuit or a receiver circuit for each magnitude of amplitude voltage values as in the case of determining the transmission mode on the basis of the amplitude voltage values of the data signal. This therefore makes it possible to achieve reduction in circuit size in the communication system in which the voltage amplitude value varies depending on transmission modes in the transmission of the data signal.

Further, in the present embodiment, the transmission mode is determined in the slave 40 on the basis of the result of the comparison between the clock frequency Fc and the one or a plurality of reference frequencies Fth. A circuit that performs such a determination may be configured by a typical pulse counter, etc. Accordingly, even in a case of separately providing the circuit that performs such a determination, the reduction in circuit size is not prevented.

Further, the communication system 4 of the present embodiment is also applicable to the high-speed interface specifications (e.g., the C-PHY specification and the D-PHY specification). Accordingly, it is possible, even in such high-speed interface specifications, to achieve the reduction in circuit size.

6. Application Examples

In the following, description is given of application examples of the communication systems 1, 2, 3, and 4 according to the foregoing respective embodiments and modification examples thereof.

Application Example 1

FIG. 16 illustrates an example of application of the communication systems 1, 2, 3, and 4 according to the foregoing respective embodiments and modification examples thereof. For example, the communication systems 1, 2, 3, and 4 according to the foregoing respective embodiments and modification examples thereof are applicable to data transmission from an image sensor IS to an application processor AP, as illustrated in FIG. 16. The transmitter 1B is provided in the image sensor IS. The transmitter 1B corresponds to each of the transmitters 10 of the communication systems 1, 2, 3, and 4 according to the foregoing respective embodiments and modification examples thereof. The receiver 2B is provided in the application processor AP. The receiver 2B corresponds to each of the receivers 20 of the communication systems 1, 2, 3, and 4 according to the foregoing respective embodiments and modification examples thereof. The image sensor IS and the application processor AP are coupled to each other by the clock signal line 31 and the data signal line 32, or are coupled to each other only by the data signal line 32. Signal transmission via the clock signal line 31 and the data signal line 32 is made unidirectional.

The image sensor IS and the application processor AP are coupled to each other by a bidirectional control bus 33. The control bus 33 may use an I²C (Inter-Integrated Circuit) interface or an I³C interface that is an extension version of the I²C interface.

FIG. 17 illustrates an example of a data transmission processing in a device including the image sensor IS and the application processor AP illustrated in FIG. 16.

When the device including the image sensor IS and the application processor AP is powered on (step S101), the application processor AP reads a register setting of the image sensor IS with use of the control bus 33 (step S102). This allows the application processor AP to determine whether the image sensor IS corresponds to communication without an LP signal (step S103). In other words, determination is made whether the image sensor IS corresponds to a mode in which communication using only an HS differential signal without using the LP signal is performed or a mode in which communication using both the LP signal and the HS differential signal is performed. In a case where determination is made that the image sensor IS corresponds to communication without the LP signal (step S103; Y), the application processor AP transmits a setting for validating communication without the LP signal to the image sensor IS with use of the control bus 35 (step S104).

Next, the application processor AP determines whether the application processor AP corresponds to a new LPDT communication (step S105). In a case where determination is made that the application processor AP corresponds to the new LPDT communication (e.g., the communication according to an embodiment of the disclosure) (step S105; Y), the application processor AP transmits a setting for validating the new LPDT communication to the image sensor IS with use of the control bus 35 (step S106).

Next, the application processor AP outputs, to the image sensor IS, a signal instructing transmission start with use of the control bus 35 (step S107). In a case where determination is made that the image sensor IS does not correspond to the communication without the LP signal (step S103; N), the application processor AP considers the image sensor IS to be in a mode in which communication is performed using both the LP signal and the HS differential signal to output the signal instructing transmission start to the image sensor IS with use of the control bus 35 (step S107). Next, the image sensor IS starts transmitting the data signal upon reception of the signal instructing transmission start (step S108).

Application Example 2

FIG. 18 illustrates an appearance of a smartphone 300 (a multifunctional mobile phone) to which any of the communication systems according to the foregoing respective embodiments is applied. Various devices are mounted in the smartphone 300. Any of the communication systems according to the foregoing respective embodiments is applied to a communication system in which data are exchanged among these devices.

FIG. 19 illustrates a configuration example of an application processor 310 to be used in the smartphone 300. The application processor 310 includes a central processing unit (CPU) 311, a memory controller 312, a power source controller 313, an external interface 314, a graphics processing unit (GPU) 315, a media processor 316, a display controller 317, and an MIPI interface 318. In this example, the CPU 311, the memory controller 312, the power source controller 313, the external interface 314, the GPU 315, the media processor 316, and the display controller 317 are each coupled to a system bus 319 to allow for data exchange with one another via the system bus 319.

The CPU 311 processes various pieces of information handled in the smartphone 300 in accordance with a program. The memory controller 312 controls a memory 501 to be used when the CPU 311 performs an information processing. The power source controller 313 controls a power source of the smartphone 300.

The external interface 314 is an interface for communication with external devices. In this example, the external interface 314 is coupled to a wireless communication section 502 and to an image sensor 410. The wireless communication section 502 performs wireless communication with mobile phone base stations. The wireless communication section 502 includes, for example, a baseband section, a radio frequency (RF) front end section, and other components. The image sensor 410 acquires an image, and includes, for example, a CMOS sensor.

The GPU 315 performs an image processing. The media processor 316 processes information such as voice, characters, and graphics. The display controller 317 controls a display 504 via the MIPI interface 318.

The MIPI interface 318 transmits an image signal to the display 504. As the image signal, for example, a YUV-format signal, an RGB-format signal, or any other format signal is used. For example, any of the communication systems according to the foregoing respective embodiments is applied to a communication system between the MIPI interface 318 and the display 504.

FIG. 20 illustrates a configuration example of the image sensor 410. The image sensor 410 includes a sensor section 411, an image signal processor (ISP) 412, a joint photographic experts group (JPEG) encoder 413, a CPU 414, a random access memory (RAM) 415, a read only memory (ROM) 416, a power source controller 417, an inter-integrated circuit ($I^2C$) interface 418, and an MIPI interface 419. In this example, these blocks are coupled to a system bus 420 to allow for data exchange with one another via the system bus 420.

The sensor section 411 acquires an image, and includes, for example, a CMOS sensor. The ISP 412 performs a predetermined processing on the image acquired by the sensor section 411. The JPEG encoder 413 encodes the image processed by the ISP 412 to generate a JPEG-format image. The CPU 414 controls respective blocks of the image sensor 410 in accordance with a program. The RAM 415 is a memory to be used when the CPU 414 performs an information processing. The ROM 416 stores a program to be executed in the CPU 414. The power source controller 417 controls a power source of the image sensor 410. The $I^2C$ interface 418 receives a control signal from the application processor 310. Although not illustrated, the image sensor 410 also receives a clock signal from the application processor 310, in addition to the control signal. Specifically, the image sensor 410 is configured to be operable on the basis of clock signals with various frequencies.

The MIPI interface 419 transmits an image signal to the application processor 310. As the image signal, for example, a YUV-format signal, an RGB-format signal, or any other format signal is used. For example, any of the communication systems according to the foregoing respective embodiments is applied to a communication system between the MIPI interface 419 and the application processor 310.

Application Example 3

FIG. 21 and FIG. 22 each illustrate a configuration example of a vehicle-mounted camera as an application example to an imaging device. FIG. 21 illustrates an installation example of the vehicle-mounted camera, and FIG. 22 illustrates an internal configuration example of the vehicle-mounted camera.

For example, vehicle-mounted cameras 401, 402, 403, and 404 are respectively mounted on the front (front), left, right, and rear (rear) of a vehicle 301, as illustrated in FIG. 21. The vehicle-mounted cameras 401 to 404 are each coupled to an electrical control unit (ECU) 302 via an in-vehicle network.

An image capturing angle of the vehicle-mounted camera 401 mounted on the front of the vehicle 301 is within a range indicated by "a" in FIG. 21, for example. An image capturing angle of the vehicle-mounted camera 402 is within a range indicated by "b" in FIG. 21, for example. An image capturing angle of the vehicle-mounted camera 403 is within a range indicated by "c" in FIG. 21, for example. An image capturing angle of the vehicle-mounted camera 404 is within a range indicated by "d" in FIG. 21, for example. Each of the vehicle-mounted cameras 401 to 404 outputs a captured image to the ECU 302. This consequently makes it possible to capture a 360-degree (omnidirectional) image on the front, right, left, and rear of the vehicle 301 in the ECU 302.

For example, each of the vehicle-mounted cameras 401 to 404 includes an image sensor 431, a digital signal processing (DSP) circuit 432, a selector 433, and a serializer-deserializer (SerDes) circuit 434, as illustrated in FIG. 22.

The DSP circuit 432 performs various image signal processings on an imaging signal outputted from the image sensor 431. The SerDes circuit 434 performs serial-parallel conversion of a signal, and includes, for example, a vehicle-mounted interface chip such as FPD-Link III.

The selector 433 selects whether to output the imaging signal outputted from the image sensor 431 via the DSP circuit 432 or not via the DSP circuit 432.

Any of the communication systems according to the foregoing respective embodiments is applicable to, for example, a coupling interface 441 between the image sensor 431 and the DSP circuit 432. Moreover, any of the communication systems according to the foregoing respective embodiments is applicable to, for example, a coupling interface 442 between the image sensor 431 and the selector 433.

Although the disclosure has been described above referring to the plurality of embodiments and the modification examples thereof, the disclosure is not limited to the foregoing embodiments, etc., and may be modified in a variety of ways. It is to be noted that effects described herein are merely illustrative. The effects of the disclosure are not limited to those described in the specification. The disclosure may have effects other than those described in the specification.

Further, for example, the disclosure may have the following configurations.

(1)

A communication system including:

a transmission device that outputs a clock signal with a clock frequency corresponding to a transmission mode, and outputs a data signal corresponding to the transmission mode; and a reception device that receives the clock signal and the data signal, and determines the transmission mode on a basis of magnitude of the clock frequency of the received clock signal.

(2)

The communication system according to (1), in which the reception device determines the transmission mode on a basis of a result of comparison between the clock frequency and one or a plurality of reference frequencies.

(3)

The communication system according to (1) or (2), in which the reception device determines the transmission mode to be in a high-speed mode when the clock frequency is higher than a predetermined one of the one or a plurality of reference frequencies, and determines the transmission mode to be in a low-speed mode when the clock frequency is lower than the predetermined one of the one or a plurality of reference frequencies.

(4)

The communication system according to any one of (1) to (3), in which the transmission device outputs the clock signal to a clock signal line and outputs the data signal to a data signal line, and the reception device receives the clock signal via the clock signal line and receives the data signal via the data signal line.

(5)

The communication system according to any one of (1) to (4), in which the transmission device includes a differential signal transmitter circuit that outputs a differential clock signal as the clock signal and outputs a differential data signal as the data signal, and the reception device includes a differential signal receiver circuit that receives the differential clock signal as the clock signal and receives a differential data signal as the data signal.

(6)

The communication system according to (4) or (5), in which the reception device includes a first terminating resistance coupled to the data signal line and a second terminating resistance coupled to the clock signal line, and the reception device turns ON the first terminating resistance and the second terminating resistance when a predetermined command is included in the data signal in a case where the transmission mode is in the low-speed mode.

(7)

The communication system according to any one of (1) to (3), in which the transmission device outputs to a data signal line a superimposed signal in which the clock signal is superimposed on the data signal, and the reception device receives the superimposed signal via the data signal line.

(8)

The communication system according to (7), in which the transmission device includes a differential signal transmitter circuit that outputs a differential superimposed signal as the superimposed signal, and the reception device includes a differential signal receiver circuit that receives the differential superimposed signal as the superimposed signal.

(9)

The communication system according to (7) or (8), in which the reception device includes a terminating resistance coupled to the data signal line, and the reception device turns ON the terminating resistance when a predetermined command is included in the superimposed signal.

(10)

A communication method including:

outputting a clock signal with a clock frequency corresponding to a transmission mode, outputting a data signal corresponding to the transmission mode;

receiving the clock signal and the data signal; and determining the transmission mode on a basis of magnitude of the clock frequency of the received clock signal.

This application claims the benefit of Japanese Priority Patent Application JP2015-242503 filed with the Japan Patent Office on Dec. 11, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication system comprising:

a transmission device that outputs a clock signal with a clock frequency corresponding to a transmission mode, and outputs a data signal corresponding to the transmission mode; and a reception device that receives the clock signal and the data signal, and determines the transmission mode on a basis of magnitude of the clock frequency of the received clock signal, wherein the reception device determines the transmission mode on a basis of a result of comparison between the clock frequency and one or a plurality of reference frequencies, the reception device determines the transmission mode to be in a high-speed mode when the clock frequency is higher than a predetermined one of the one or a plurality of reference frequencies, and determines the transmission mode to be in a low-speed mode when the clock frequency is lower than the predetermined one of the one or a plurality of reference frequencies, the transmission device outputs the clock signal to a clock signal line and outputs the data signal to a data signal line, the reception device receives the clock signal via the clock signal line and receives the data signal via the data signal line, the reception device includes a first terminating resistance coupled to the data signal line and a second terminating resistance coupled to the clock signal line, and the reception device turns ON the first terminating resistance and the second terminating resistance when a predetermined command is included in the data signal in a case where the transmission mode is in the low-speed mode.

2. The communication system according to claim 1, wherein the transmission device comprises a differential signal transmitter circuit that outputs a differential clock signal as the clock signal and outputs a differential data signal as the data signal, and the reception device comprises a differential signal receiver circuit that receives the differential clock signal as the clock signal and receives a differential data signal as the data signal.

3. A communication system comprising:

a transmission device that outputs a clock signal with a clock frequency corresponding to a transmission mode, and outputs a data signal corresponding to the transmission mode; and a reception device that receives the clock signal and the data signal, and determines the transmission mode on a basis of magnitude of the clock frequency of the received clock signal, wherein the reception device determines the transmission mode on a basis of a result of comparison between the clock frequency and one or a plurality of reference frequencies, the reception device determines the transmission mode to be in a high-speed mode when the clock frequency is higher than a predetermined one of the one or a plurality of reference frequencies, and determines the transmission mode to be in a low-speed mode when the clock frequency is lower than the predetermined one of the one or a plurality of reference frequencies, the transmission device outputs to a data signal line a superimposed signal in which the clock signal is superimposed on the data signal, the reception device receives the superimposed signal via the data signal line, the reception device includes a terminating resistance coupled to the data signal line, and the reception device turns ON the terminating resistance when a predetermined command is included in the superimposed signal.

4. The communication system according to claim 3, wherein the transmission device comprises a differential signal transmitter circuit that outputs a differential superimposed signal as the superimposed signal, and the reception device comprises a differential signal receiver circuit that receives the differential superimposed signal as the superimposed signal.

5. A communication method comprising:

outputting, by a transmission device, a clock signal with a clock frequency corresponding to a transmission mode, outputting, by the transmission device, a data signal corresponding to the transmission mode;

receiving, by a reception device, the clock signal and the data signal; and determining, by the reception device, the transmission mode on a basis of magnitude of the clock frequency of the received clock signal, wherein the reception device determines the transmission mode on a basis of a result of comparison between the clock frequency and one or a plurality of reference frequencies, the reception device determines the transmission mode to be in a high-speed mode when the clock frequency is higher than a predetermined one of the one or a plurality of reference frequencies, and determines the transmission mode to be in a low-speed mode when the clock frequency is lower than the predetermined one of the one or a plurality of reference frequencies, the transmission device outputs the clock signal to a clock signal line and outputs the data signal to a data signal line, the reception device receives the clock signal via the clock signal line and receives the data signal via the data signal line, the reception device includes a first terminating resistance coupled to the data signal line and a second terminating resistance coupled to the clock signal line, and the reception device turns ON the first terminating resistance and the second terminating resistance when a predetermined command is included in the data signal in a case where the transmission mode is in the low-speed mode.

\* \* \* \* \*